US011991082B2

(12) United States Patent
Jia et al.

(10) Patent No.: US 11,991,082 B2
(45) Date of Patent: May 21, 2024

(54) NETWORK CONGESTION PROCESSING METHOD AND RELATED APPARATUS

(71) Applicant: Huawei Technologies Co., Ltd., Shenzhen (CN)

(72) Inventors: Xitong Jia, Nanjing (CN); Weiqing Kong, Nanjing (CN); Hewen Zheng, Nanjing (CN); Liang Zhang, Nanjing (CN)

(73) Assignee: HUAWEI TECHNOLOGIES CO., LTD., Shenzhen (CN)

( * ) Notice: Subject to any disclaimer, the term of this patent is extended or adjusted under 35 U.S.C. 154(b) by 296 days.

(21) Appl. No.: 17/696,140

(22) Filed: Mar. 16, 2022

(65) Prior Publication Data
US 2022/0210069 A1  Jun. 30, 2022

Related U.S. Application Data

(63) Continuation of application No. PCT/CN2020/115158, filed on Sep. 14, 2020.

(30) Foreign Application Priority Data

Sep. 16, 2019 (CN) .......................... 201910872367.5

(51) Int. Cl.
*H04L 47/11* (2022.01)
*H04L 41/0823* (2022.01)
(Continued)

(52) U.S. Cl.
CPC ........ *H04L 47/115* (2013.01); *H04L 41/0823* (2013.01); *H04L 43/16* (2013.01); *H04L 47/12* (2013.01)

(58) Field of Classification Search
None
See application file for complete search history.

(56) References Cited

U.S. PATENT DOCUMENTS 7,369,498 B1 * 5/2008 Ma .......................... H04L 47/30
370/235
7,961,605 B2 * 6/2011 Gusat .................. H04L 43/0864
709/224
(Continued)

FOREIGN PATENT DOCUMENTS

CN 101056260 A 10/2007
CN 102577498 A 7/2012
(Continued)

OTHER PUBLICATIONS 802.1Qau-2010 "IEEE Standard for Local and Metropolitan Area Networks—Virtual Bridged Local Area Networks Amendment 13: Congestion Notification," Apr. 23, 2010, 135 pages.
(Continued)

*Primary Examiner* — Eunsook Choi
(74) *Attorney, Agent, or Firm* — Conley Rose, P.C.

(57) ABSTRACT

A network congestion processing method includes performing Explicit Congestion Notification (ECN) marking on a packet using first ECN configuration information, obtaining first network status information indicating a network status when the first ECN configuration information is used; determining second ECN configuration information based on the first ECN configuration information and the first network status information; and performing ECN marking on the packet using the second ECN configuration information.

20 Claims, 8 Drawing Sheets

(51) Int. Cl.
*H04L 43/16* (2022.01)
*H04L 47/12* (2022.01)

(56) References Cited

U.S. PATENT DOCUMENTS

| | | | | |
|---|---|---|---|---|
| 9,584,417 | B2* | 2/2017 | Johansson | H04L 47/11 |
| 9,674,104 | B1* | 6/2017 | Pan | H04L 47/56 |
| 10,341,901 | B2* | 7/2019 | Baillargeon | H04L 47/31 |
| 10,516,620 | B2* | 12/2019 | Mayer-Wolf | H04L 47/32 |
| 11,082,344 | B2* | 8/2021 | Ramanathan | H04L 47/22 |
| 11,252,088 | B2* | 2/2022 | Tadimeti | H04L 43/087 |
| 11,750,504 | B2* | 9/2023 | Hewson | G06F 13/28 |
| | | | | 370/413 |
| 2011/0075563 | A1* | 3/2011 | Leung | H04W 28/12 |
| | | | | 370/236 |
| 2013/0155855 | A1 | 6/2013 | Kross et al. | |
| 2014/0064079 | A1 | 3/2014 | Kwan et al. | |
| 2014/0126357 | A1 | 5/2014 | Kulkarni et al. | |
| 2020/0296043 | A1 | 9/2020 | Liu et al. | |

FOREIGN PATENT DOCUMENTS

| | | |
|---|---|---|
| CN | 102638395 A | 8/2012 |
| CN | 106506275 A | 3/2017 |
| CN | 106789701 A | 5/2017 |
| CN | 108965151 A | 12/2018 |
| CN | 109861925 A | 6/2019 |
| CN | 110061927 A | 7/2019 |
| EP | 1123604 A2 | 8/2001 |
| WO | 9965185 A2 | 12/1999 |

OTHER PUBLICATIONS

Xie Wei Bin, "Research on Congestion Control and Flow Scheduling Technology for Cloud Datacenters," Huazhong University of Science and Technology, Wuhan 430074, P R. China, Dec. 2018, with an English Abstract, 130 pages.
RFC 3168, K. Ramakrishnan, et al, "The Addition of Explicit Congestion Notification (ECN) to IP," Sep. 2001, 63 pages.
RFC 8257, S. Bensley, et al, "Data Center TCP (DCTCP): TCP Congestion Control for Data Centers," Oct. 2017, 17 pages.
Kuzmanovic, Aleksandar, "The Power of Explicit Congestion Notification," XP058144778, Aug. 22-26, 2005, 12 pages.

* cited by examiner

NETWORK CONGESTION PROCESSING METHOD AND RELATED APPARATUS

CROSS-REFERENCE TO RELATED APPLICATIONS

This is a continuation of International Patent Application No. PCT/CN2020/115158 filed on Sep. 14, 2020, which claims priority to Chinese Patent Application No. 201910872367.5 filed on Sep. 16, 2019. The disclosures of the aforementioned applications are hereby incorporated by reference in their entireties.

TECHNICAL FIELD

This application relates to the field of communications technologies, and in particular, to a network congestion processing method and a related apparatus.

BACKGROUND

In the big data era, many large internet enterprises have built many data centers around the world to provide users with higher-quality services. Network congestion is a common problem in the data center. Network congestion is usually caused by insufficient network device capabilities or transient traffic bursts.

A cache of a network device in the data center is relatively small. Therefore, once severe network congestion occurs, the network device directly discards a data packet, and consequently a relatively high service delay is caused. This affects real-time performance of an application, and deteriorates user experience.

SUMMARY

This application provides a network congestion processing method and a related apparatus, so that network congestion control can adapt to a change in a network operating environment.

According to a first aspect, this application provides a network congestion processing method, including performing Explicit Congestion Notification (ECN) marking on a packet by using first ECN configuration information, and obtaining first network status information, where the first network status information is used to indicate a network status when the first ECN configuration information is used, determining second ECN configuration information based on the first ECN configuration information and the first network status information, and performing ECN marking on the packet by using the second ECN configuration information.

In the foregoing technical solution, ECN configuration information to be subsequently used can be determined based on a network status of currently used ECN configuration information. In this way, ECN configuration information can be dynamically adjusted to adapt to a change in a network operating environment, thereby improving network performance.

In a possible design, determining second ECN configuration information based on the first ECN configuration information and the first network status information includes determining whether a quantity of ECN marked packets in the first network status information is less than a preset threshold, and if the quantity of marked packets in the first network status information is greater than or equal to the preset threshold, determining that an upper ECN threshold in the second ECN configuration information is greater than an upper ECN threshold in the first ECN configuration information, determining that a lower ECN threshold in the second ECN configuration information is equal to a lower ECN threshold in the first ECN configuration information, and determining that a maximum ECN marking probability in the second ECN configuration information is equal to a maximum ECN marking probability in the first ECN configuration information, or if the quantity of marked packets in the first network status information is less than the preset threshold, determining that the second ECN configuration information is the same as the first ECN configuration information.

In the foregoing technical solution, ECN configuration information can be adjusted when currently used ECN configuration information cannot meet a current network status.

In a possible design, determining second ECN configuration information based on the first ECN configuration information and the first network status information includes determining a change trend of a congestion degree based on the first network status information, and determining the second ECN configuration information based on a determining result, the first ECN configuration information, and third ECN configuration information, where the first ECN configuration information is determined based on the third ECN configuration information.

In the foregoing technical solution, ECN configuration information can be adjusted when currently used ECN configuration information cannot meet a current network status. In addition, in the foregoing technical solution, in a process of adjusting the currently used ECN configuration information, a previous adjustment result is further referenced, so that adjusted ECN configuration information can be better applied to a current network operating environment.

In a possible design, determining the second ECN configuration information based on a determining result, the first ECN configuration information, and third ECN configuration information includes determining the second ECN configuration information when an upper ECN threshold in the first ECN configuration information is greater than an upper ECN threshold in the third ECN configuration information, a lower ECN threshold in the first ECN configuration information is equal to a lower ECN threshold in the third ECN configuration information, a maximum ECN marking probability in the first ECN configuration information is equal to a maximum ECN marking probability in the third ECN configuration information, and the congestion degree decreases, where an upper ECN threshold in the second ECN configuration information is greater than the upper ECN threshold in the first ECN configuration information, a lower ECN threshold in the second ECN configuration information is greater than the lower ECN threshold in the first ECN configuration information, and a maximum ECN marking probability in the second ECN configuration information is equal to the maximum ECN marking probability in the first ECN configuration information, or determining the second ECN configuration information when an upper ECN threshold in the first ECN configuration information is greater than an upper ECN threshold in the third ECN configuration information, a lower ECN threshold in the first ECN configuration information is equal to a lower ECN threshold in the third ECN configuration information, a maximum ECN marking probability in the first ECN configuration information is equal to a maximum ECN marking probability in the third ECN configuration information, and the congestion degree does not decrease, where an upper ECN threshold in the second ECN configuration information is equal to the upper ECN threshold in the first ECN configuration information, a lower ECN threshold in the second ECN configuration information is greater than the lower ECN threshold in the first ECN configuration information, and a maximum ECN marking probability in the second ECN configuration information is equal to the maximum ECN marking probability in the first ECN configuration information.

In a possible design, before performing ECN marking on a packet by using first ECN configuration information, the method further includes obtaining reference network status information, determining congestion indication information based on the reference network status information, where the congestion indication information is used to indicate the congestion degree, sending the congestion indication information to a network device, and receiving the third ECN configuration information from the network device.

In the foregoing solution, a network congestion status may be notified to another network device, and ECN configuration information from the other network device may be received. The ECN configuration information from the other network device is determined by the network device based on a global network state. In this way, adjustment of the ECN configuration information can adapt to a network status of an entire data center network.

In a possible design, determining the second ECN configuration information based on a determining result, the first ECN configuration information, and third ECN configuration information includes determining the second ECN configuration information when an upper ECN threshold in the first ECN configuration information is greater than an upper ECN threshold in the third ECN configuration information, a lower ECN threshold in the first ECN configuration information is greater than a lower ECN threshold in the third ECN configuration information, a maximum ECN marking probability in the first ECN configuration information is equal to a maximum ECN marking probability in the third ECN configuration information, and the congestion degree decreases, where an upper ECN threshold in the second ECN configuration information is greater than the upper ECN threshold in the first ECN configuration information, a lower ECN threshold in the second ECN configuration information is greater than the lower ECN threshold in the first ECN configuration information, and a maximum ECN marking probability in the second ECN configuration information is equal to the maximum ECN marking probability in the first ECN configuration information, or determining the second ECN configuration information when an upper ECN threshold in the first ECN configuration information is greater than an upper ECN threshold in the third ECN configuration information, a lower ECN threshold in the first ECN configuration information is greater than a lower ECN threshold in the third ECN configuration information, a maximum ECN marking probability in the first ECN configuration information is equal to a maximum ECN marking probability in the third ECN configuration information, and the congestion degree does not decrease, where an upper ECN threshold in the second ECN configuration information is greater than the upper ECN threshold in the first ECN configuration information, a lower ECN threshold in the second ECN configuration information is equal to the lower ECN threshold in the first ECN configuration information, and a maximum ECN marking probability in the second ECN configuration information is equal to the maximum ECN marking probability in the first ECN configuration information.

In a possible design, determining the second ECN configuration information based on a determining result, the first ECN configuration information, and third ECN configuration information includes determining the second ECN configuration information when an upper ECN threshold in the first ECN configuration information is equal to an upper ECN threshold in the third ECN configuration information, a lower ECN threshold in the first ECN configuration information is greater than a lower ECN threshold in the third ECN configuration information, a maximum ECN marking probability in the first ECN configuration information is equal to a maximum ECN marking probability in the third ECN configuration information, and the congestion degree decreases, where an upper ECN threshold in the second ECN configuration information is equal to the upper ECN threshold in the first ECN configuration information, a lower ECN threshold in the second ECN configuration information is greater than the lower ECN threshold in the first ECN configuration information, and a maximum ECN marking probability in the second ECN configuration information is less than the maximum ECN marking probability in the first ECN configuration information, or determining the second ECN configuration information when an upper ECN threshold in the first ECN configuration information is equal to an upper ECN threshold in the third ECN configuration information, a lower ECN threshold in the first ECN configuration information is greater than a lower ECN threshold in the third ECN configuration information, a maximum ECN marking probability in the first ECN configuration information is equal to a maximum ECN marking probability in the third ECN configuration information, and the congestion degree does not decrease, where an upper ECN threshold in the second ECN configuration information is equal to the upper ECN threshold in the first ECN configuration information, a lower ECN threshold in the second ECN configuration information is equal to the lower ECN threshold in the first ECN configuration information, and a maximum ECN marking probability in the second ECN configuration information is less than the maximum ECN marking probability in the first ECN configuration information.

In a possible design, determining the second ECN configuration information based on a determining result, the first ECN configuration information, and third ECN configuration information includes determining the second ECN configuration information when an upper ECN threshold in the first ECN configuration information is equal to an upper ECN threshold in the third ECN configuration information, a lower ECN threshold in the first ECN configuration information is greater than a lower ECN threshold in the third ECN configuration information, a maximum ECN marking probability in the first ECN configuration information is less than a maximum ECN marking probability in the third ECN configuration information, and the congestion degree decreases, where an upper ECN threshold in the second ECN configuration information is equal to the upper ECN threshold in the first ECN configuration information, a lower ECN threshold in the second ECN configuration information is greater than the lower ECN threshold in the first ECN configuration information, and a maximum ECN marking probability in the second ECN configuration information is less than the maximum ECN marking probability in the first ECN configuration information, or determining the second ECN configuration information when an upper ECN threshold in the first ECN configuration information is equal to an upper ECN threshold in the third ECN configuration information, a lower ECN threshold in the first ECN configuration information is greater than a lower ECN threshold in the third ECN configuration information, a maximum ECN marking probability in the first ECN configuration information is less than a maximum ECN marking probability in the third ECN configuration information, and the congestion degree does not decrease, where an upper ECN threshold in the second ECN configuration information is equal to the upper ECN threshold in the first ECN configuration information, a lower ECN threshold in the second ECN configuration information is greater than the lower ECN threshold in the first ECN configuration information, and a maximum ECN marking probability in the second ECN configuration information is equal to the maximum ECN marking probability in the first ECN configuration information.

In a possible design, determining the second ECN configuration information based on a determining result, the first ECN configuration information, and third ECN configuration information includes determining the second ECN configuration information when an upper ECN threshold in the first ECN configuration information is equal to an upper ECN threshold in the third ECN configuration information, a lower ECN threshold in the first ECN configuration information is equal to a lower ECN threshold in the third ECN configuration information, a maximum ECN marking probability in the first ECN configuration information is less than a maximum ECN marking probability in the third ECN configuration information, and the congestion degree decreases, where an upper ECN threshold in the second ECN configuration information is equal to the upper ECN threshold in the first ECN configuration information, a lower ECN threshold in the second ECN configuration information is equal to the lower ECN threshold in the first ECN configuration information, and a maximum ECN marking probability in the second ECN configuration information is less than the maximum ECN marking probability in the first ECN configuration information, or determining the second ECN configuration information when an upper ECN threshold in the first ECN configuration information is equal to an upper ECN threshold in the third ECN configuration information, a lower ECN threshold in the first ECN configuration information is equal to a lower ECN threshold in the third ECN configuration information, a maximum ECN marking probability in the first ECN configuration information is less than a maximum ECN marking probability in the third ECN configuration information, and the congestion degree does not decrease, where an upper ECN threshold in the second ECN configuration information is less than the upper ECN threshold in the first ECN configuration information, a lower ECN threshold in the second ECN configuration information is equal to the lower ECN threshold in the first ECN configuration information, and a maximum ECN marking probability in the second ECN configuration information is equal to the maximum ECN marking probability in the first ECN configuration information.

In a possible design, determining the second ECN configuration information based on a determining result, the first ECN configuration information, and third ECN configuration information includes determining the second ECN configuration information when an upper ECN threshold in the first ECN configuration information is less than an upper ECN threshold in the third ECN configuration information, a lower ECN threshold in the first ECN configuration information is equal to a lower ECN threshold in the third ECN configuration information, a maximum ECN marking probability in the first ECN configuration information is equal to a maximum ECN marking probability in the third ECN configuration information, and the congestion degree increases, where an upper ECN threshold in the second ECN configuration information is equal to the upper ECN threshold in the first ECN configuration information, a lower ECN threshold in the second ECN configuration information is less than the lower ECN threshold in the first ECN configuration information, and a maximum ECN marking probability in the second ECN configuration information is equal to the maximum ECN marking probability in the first ECN configuration information, or determining the second ECN configuration information when an upper ECN threshold in the first ECN configuration information is less than an upper ECN threshold in the third ECN configuration information, a lower ECN threshold in the first ECN configuration information is equal to a lower ECN threshold in the third ECN configuration information, a maximum ECN marking probability in the first ECN configuration information is equal to a maximum ECN marking probability in the third ECN configuration information, and the congestion degree does not increase, where an upper ECN threshold in the second ECN configuration information is less than the upper ECN threshold in the first ECN configuration information, a lower ECN threshold in the second ECN configuration information is equal to the lower ECN threshold in the first ECN configuration information, and a maximum ECN marking probability in the second ECN configuration information is equal to the maximum ECN marking probability in the first ECN configuration information.

In a possible design, determining the second ECN configuration information based on a determining result, the first ECN configuration information, and third ECN configuration information includes determining the second ECN configuration information when an upper ECN threshold in the first ECN configuration information is equal to an upper ECN threshold in the third ECN configuration information, a lower ECN threshold in the first ECN configuration information is less than a lower ECN threshold in the third ECN configuration information, a maximum ECN marking probability in the first ECN configuration information is equal to a maximum ECN marking probability in the third ECN configuration information, and the congestion degree increases, where an upper ECN threshold in the second ECN configuration information is equal to the upper ECN threshold in the first ECN configuration information, a lower ECN threshold in the second ECN configuration information is equal to the lower ECN threshold in the first ECN configuration information, and a maximum ECN marking probability in the second ECN configuration information is greater than the maximum ECN marking probability in the first ECN configuration information, or determining the second ECN configuration information when an upper ECN threshold in the first ECN configuration information is equal to an upper ECN threshold in the third ECN configuration information, a lower ECN threshold in the first ECN configuration information is less than a lower ECN threshold in the third ECN configuration information, a maximum ECN marking probability in the first ECN configuration information is equal to a maximum ECN marking probability in the third ECN configuration information, and the congestion degree does not increase, where an upper ECN threshold in the second ECN configuration information is equal to the upper ECN threshold in the first ECN configuration information, a lower ECN threshold in the second ECN configuration information is less than the lower ECN threshold in the first ECN configuration information, and a maximum ECN marking probability in the second ECN configuration information is equal to the maximum ECN marking probability in the first ECN configuration information.

In a possible design, determining the second ECN configuration information based on a determining result, the first ECN configuration information, and third ECN configuration information includes determining the second ECN configuration information when an upper ECN threshold in the first ECN configuration information is equal to an upper ECN threshold in the third ECN configuration information, a lower ECN threshold in the first ECN configuration information is equal to a lower ECN threshold in the third ECN configuration information, a maximum ECN marking probability in the first ECN configuration information is greater than a maximum ECN marking probability in the third ECN configuration information, and the congestion degree increases, where an upper ECN threshold in the second ECN configuration information is equal to the upper ECN threshold in the first ECN configuration information, a lower ECN threshold in the second ECN configuration information is equal to the lower ECN threshold in the first ECN configuration information, and a maximum ECN marking probability in the second ECN configuration information is equal to the maximum ECN marking probability in the first ECN configuration information, or determining the second ECN configuration information when an upper ECN threshold in the first ECN configuration information is equal to an upper ECN threshold in the third ECN configuration information, a lower ECN threshold in the first ECN configuration information is equal to a lower ECN threshold in the third ECN configuration information, a maximum ECN marking probability in the first ECN configuration information is greater than a maximum ECN marking probability in the third ECN configuration information, and the congestion degree does not increase, where an upper ECN threshold in the second ECN configuration information is equal to the upper ECN threshold in the first ECN configuration information, a lower ECN threshold in the second ECN configuration information is equal to the lower ECN threshold in the first ECN configuration information, and a maximum ECN marking probability in the second ECN configuration information is greater than the maximum ECN marking probability in the first ECN configuration information.

In a possible design, when the upper ECN threshold in the second ECN configuration information is equal to the upper ECN threshold in the first ECN configuration information, the lower ECN threshold in the second ECN configuration information is equal to the lower ECN threshold in the first ECN configuration information, and the maximum ECN marking probability in the second ECN configuration information is equal to the maximum ECN marking probability in the first ECN configuration information, the method further includes obtaining second network status information, where the second network status information is used to indicate a network status when the second ECN configuration information is used, determining whether a quantity of marked packets in the second network status information is less than a preset threshold, and if the quantity of marked packets in the second network status information is greater than or equal to the preset threshold, determining fourth ECN configuration information based on the second ECN configuration information, where an upper ECN threshold in the fourth ECN configuration information is greater than the upper ECN threshold in the second ECN configuration information, a lower ECN threshold in the fourth ECN configuration information is equal to the lower ECN threshold in the second ECN configuration information, and a maximum ECN marking probability in the fourth ECN configuration information is equal to the maximum ECN marking probability in the second ECN configuration information, or if the quantity of marked packets in the second network status information is less than the preset threshold, continuing to perform ECN marking on the packet by using the second ECN configuration information.

According to a second aspect, an embodiment of this application provides a network congestion processing method. The method includes separately receiving N pieces of congestion indication information from N first switches, and determining initial ECN configuration information based on the N pieces of congestion indication information, and sending the initial ECN configuration information to the N first switches.

In a possible design, the initial ECN configuration information includes N pieces of ECN configuration information, and determining initial ECN configuration information based on the N pieces of congestion indication information includes determining the N pieces of ECN configuration information based on a congestion degree indicated by the N pieces of congestion indication information.

According to a third aspect, an embodiment of this application provides an electronic apparatus. The electronic apparatus includes units configured to implement any possible implementation of the method design in the first aspect. The electronic apparatus may be a network device or a component (for example, a chip or a circuit) used for the network device.

According to a fourth aspect, an embodiment of this application provides an electronic apparatus. The electronic apparatus includes units configured to implement any possible implementation of the method design in the second aspect. The communications apparatus may be a network device or a component (for example, a chip or a circuit) used for the network device.

According to a fifth aspect, an embodiment of this application provides a network device, including a transceiver and a processor. Optionally, the network device further includes a memory. The processor is configured to control the transceiver to send and receive a signal. The memory is configured to store a computer program. The processor is configured to invoke the computer program from the memory and run the computer program, to enable the network device to perform the method in any possible implementation of the method design in the first aspect.

According to a sixth aspect, an embodiment of this application provides a network device, including a transceiver and a processor. Optionally, the network device further includes a memory. The processor is configured to control the transceiver to send and receive a signal. The memory is configured to store a computer program. The processor is configured to invoke the computer program from the memory and run the computer program, to enable the network device to perform the method in any possible implementation of the method design in the second aspect.

According to a seventh aspect, an embodiment of this application provides a communications system. The system includes the network device in the fifth aspect and the network device in the sixth aspect.

According to an eighth aspect, an embodiment of this application provides an electronic apparatus. The electronic apparatus may be a network device configured to implement the method design in the first aspect, or may be a chip disposed in the network device. The electronic apparatus includes a processor. The processor is coupled to a memory and may be configured to execute instructions and/or program code in the memory, to implement the method in any possible implementation of the method design in the first aspect. Optionally, the electronic apparatus further includes the memory. Optionally, the electronic apparatus further includes a communications interface, and the processor is coupled to the communications interface.

When the electronic apparatus is the network device, the communications interface may be a transceiver or an input/output interface.

When the electronic apparatus is the chip disposed in the network device, the communications interface may be an input/output interface.

Optionally, the transceiver may be a transceiver circuit. Optionally, the input/output interface may be an input/output circuit.

According to a ninth aspect, an embodiment of this application provides an electronic apparatus. The electronic apparatus may be a network device configured to implement the method design in the second aspect, or may be a chip disposed in the network device. The electronic apparatus includes a processor. The processor is coupled to a memory and may be configured to execute instructions and/or program code in the memory, to implement the method in any possible implementation of the method design in the second aspect. Optionally, the electronic apparatus further includes the memory. Optionally, the electronic apparatus further includes a communications interface, and the processor is coupled to the communications interface.

When the electronic apparatus is the network device, the communications interface may be a transceiver or an input/output interface.

When the electronic apparatus is the chip disposed in the network device, the communications interface may be an input/output interface.

Optionally, the transceiver may be a transceiver circuit. Optionally, the input/output interface may be an input/output circuit.

According to a tenth aspect, an embodiment of this application provides a computer program product. The computer program product includes computer program code. When the computer program code is run on a computer, the computer is enabled to perform the method in any possible implementation of the method design in the first aspect.

According to an eleventh aspect, an embodiment of this application provides a computer program product. The computer program product includes computer program code. When the computer program code is run on a computer, the computer is enabled to perform the method in any possible implementation of the method design in the second aspect.

According to a twelfth aspect, an embodiment of this application provides a computer-readable medium. The computer-readable medium stores program code. When the computer program code is run on a computer, the computer is enabled to perform the method in any possible implementation of the method design in the first aspect.

According to a thirteenth aspect, an embodiment of this application provides a computer-readable medium. The computer-readable medium stores program code. When the computer program code is run on a computer, the computer is enabled to perform the method in any possible implementation of the method design in the second aspect.

DESCRIPTION OF EMBODIMENTS

Figure 1:
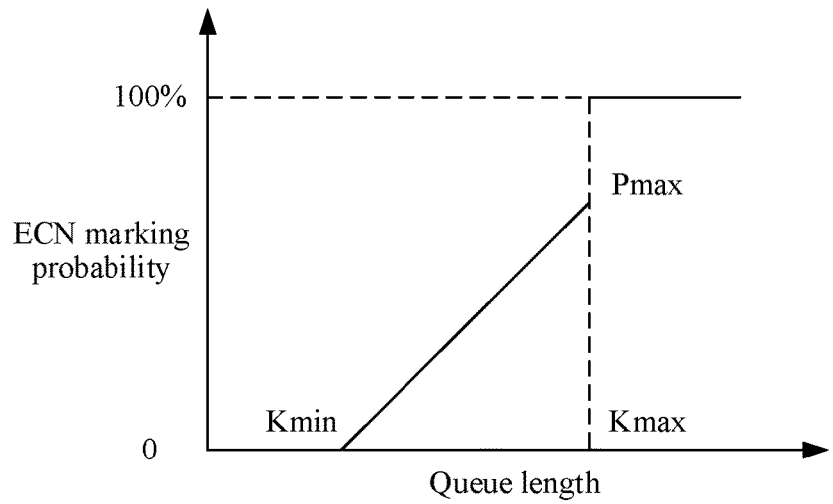
FIG. 1 shows a relationship between all pieces of information in ECN configuration information.

The following describes technical solutions in this application with reference to accompanying drawings.

All aspects, embodiments, or features are presented in this application by describing a system that may include a plurality of devices, components, modules, and the like. It should be appreciated and understood that each system may include another device, component, module, and the like, and/or may not include all devices, components, modules, and the like discussed with reference to the accompanying drawings. In addition, a combination of these solutions may be used.

In addition, the term "example", or "for example" in the embodiments of this application is used to represent giving an example, an illustration, or a description. Any embodiment or design scheme described as an "example" in this application should not be explained as being more preferred or having more advantages than another embodiment or design scheme. Exactly, the term "example" is used to present a concept in a specific manner.

In the embodiments of this application, "relevant", and "corresponding" may be interchangeably used sometimes. It should be noted that meanings expressed by the terms are consistent when differences are not emphasized.

In the embodiments of this application, sometimes a subscript such as $W_1$ may be written in an incorrect form such as W1. Expressed meanings are consistent when differences are not emphasized.

A network architecture and a service scenario described in the embodiments of this application are intended to describe the technical solutions in the embodiments of this application more clearly, and do not constitute any limitation on the technical solutions provided in the embodiments of this application. A person of ordinary skill in the art may know that with evolution of the network architecture and emergence of a new service scenario, the technical solutions provided in the embodiments of this application are also applicable to a similar technical problem.

Reference to "an embodiment", "some embodiments", or the like described in this specification indicates that one or more embodiments of this application include a specific feature, structure, or characteristic described with reference to the embodiments. Therefore, statements such as "in an embodiment", "in some embodiments", "in some other embodiments", and "in other embodiments", that appear at different places in this specification do not necessarily mean referring to a same embodiment, instead, they mean "one or more but not all of the embodiments", unless otherwise emphasized. The terms "include", "contain", "have", and their variants all mean "include but are not limited to", unless otherwise emphasized.

In this application, "at least one" refers to one or more, and "a plurality of" refers to two or more. The term "and/or" describes an association relationship between associated objects and indicates that three relationships may exist. For example, A and/or B may indicate the following cases: only A exists, both A and B exist, and only B exists, where A and B may be singular or plural. The character "/" usually indicates an "or" relationship between the associated objects. "At least one of the following" or a similar expression thereof indicates "any combination of the following", including "one or any combination of the following". For example, at least one of a, b, or c may represent: a, b, c, a and b, a and c, b and c, or a, b, and c, where a, b, or c may be in a singular or plural form.

For ease of understanding of the embodiments of this application, several terms used in this application are first briefly described.

1. ECN:

The ECN is an extension of the Transmission Control Protocol (TCP)/Internet Protocol (IP). A network using the ECN can implement congestion control without discarding a packet.

Further, a switch or another device having a switch function adds an ECN flag to an IP header of a to-be-forwarded packet, to notify a receive end device that network congestion occurs. After receiving the packet carrying the ECN flag, the receive end device may determine that network congestion occurs on the switch, and the receive end device may send a response packet to a transmit end device. After receiving the response packet, the transmit end device may reduce a packet sending rate. In this way, the congestion on the switch can be relieved, and network congestion can be controlled without discarding the packet.

2. ECN Configuration Information:

A switch may perform ECN marking on a packet based on the ECN configuration information. The ECN configuration information generally includes one or more of the following: an upper ECN threshold, a lower ECN threshold, and a maximum ECN marking probability. For ease of description, in the embodiments of this application, it is assumed that the ECN configuration information includes the upper ECN threshold, the lower ECN threshold, and the maximum ECN marking probability.

The upper ECN threshold may be denoted as Kmax. When a quantity of to-be-transmitted packets in a queue is greater than or equal to Kmax, the switch may mark the packets in the queue with a probability of 100%. In other words, if a queue length is greater than or equal to Kmax, the switch marks each packet in the queue.

The lower ECN threshold may be denoted as Kmin. When a quantity of to-be-transmitted packets in a queue is less than or equal to Kmin, the switch may mark the packets in the queue with a probability of 0%. In other words, if a queue length is less than or equal to Kmin, the switch does not mark any packet in the queue.

The maximum ECN marking probability may be denoted as Pmax. When a quantity of to-be-transmitted packets in a queue is greater than Kmin and less than Kmax, the switch may mark the packets in the queue with a probability greater than P %, where P is a number greater than 0 and less than or equal to Pmax, and Pmax is less than 100%. As the queue length increases, the probability of marking the packets in the queue by the switch increases. The maximum ECN marking probability is a specified maximum value of a marking probability in the queue. In other words, if the queue length is greater than Kmin and less than Kmax, the switch marks P % of the packets in the queue, and a value of P may be positively correlated with the queue length.

A relationship between an upper ECN threshold, a lower ECN threshold, an ECN marking probability, and a maximum ECN marking probability may be shown in FIG. 1.

FIG. 1 shows a relationship between all pieces of information in ECN configuration information.

As shown in FIG. 1, when a queue length is less than Kmin, an ECN marking probability is 0. When the queue length is greater than or equal to Kmax, the ECN marking probability is 100%. When the queue length is greater than Kmin and less than Kmax, the ECN marking probability is a value greater than 0 and less than Pmax.

Performing ECN marking on a packet by a switch based on the ECN configuration information may include, if the queue length is less than or equal to Kmin, the switch does not mark any packet in a queue. If the queue length is greater than or equal to Kmax, the switch marks each packet in the queue. If the queue length is greater than Kmin and less than Kmax, the switch marks P % of the packets in the queue, where P is a number greater than 0 and less than or equal to Pmax, and Pmax is less than 100%. The switch may perform packet marking randomly.

Figure 2:
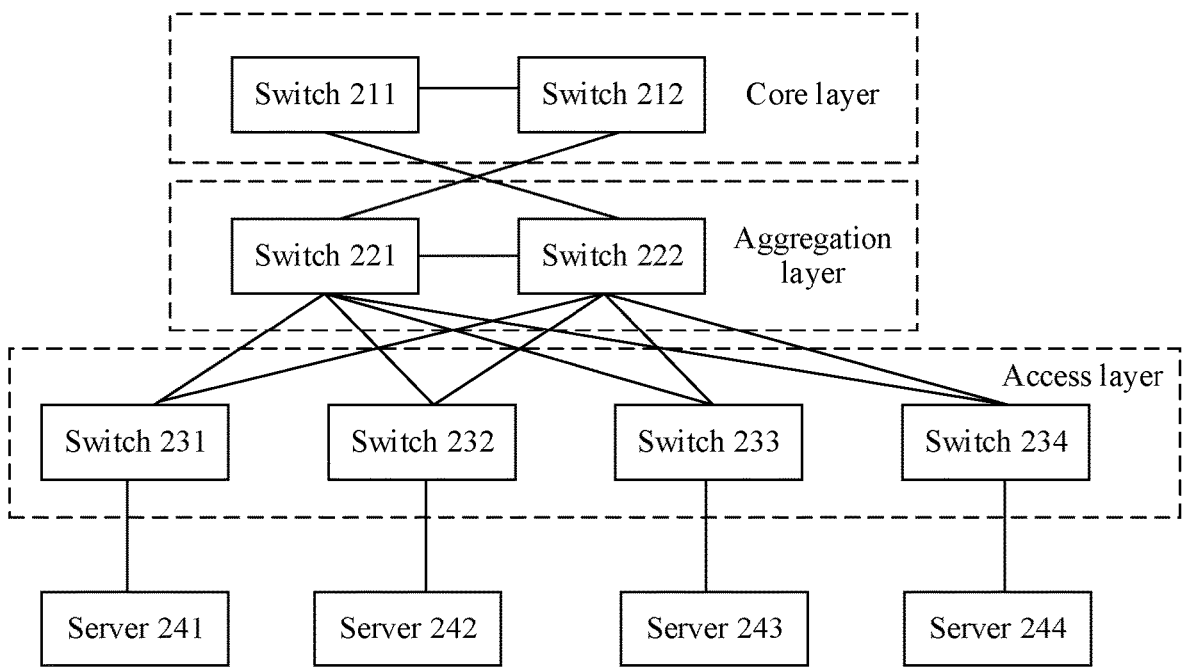
FIG. 2 is a schematic diagram of a structure of a data center network to which technical solutions in this application may be applied.

FIG. 2 is a schematic diagram of a structure of a data center network to which technical solutions in this application may be applied. The data center network shown in FIG. 2 is a data center network with a three-layer structure. The three-layer network includes a core layer, an aggregation layer, and an access layer.

In the data center network shown in FIG. 2, the core layer includes a switch 211 and a switch 212, the aggregation layer includes a switch 221 and a switch 222, and the access layer includes a switch 231, a switch 232, a switch 233, and a switch 234. The switch 231 is connected to a server 241, the switch 232 is connected to a server 242, the switch 233 is connected to a server 243, and the switch 234 is connected to a server 244.

It may be understood that FIG. 2 is merely an example of a data center network with a three-layer structure, but is not a limitation on a data center network with a three-layer structure. For example, the data center network with the three-layer structure may further include more switches and/or servers, or may include fewer switches and/or servers. In addition, a connection relationship between switches and/or a connection relationship between a server and a switch in the data center network with the three-layer structure may be another connection manner other than that shown in FIG. 2.

Figure 3:
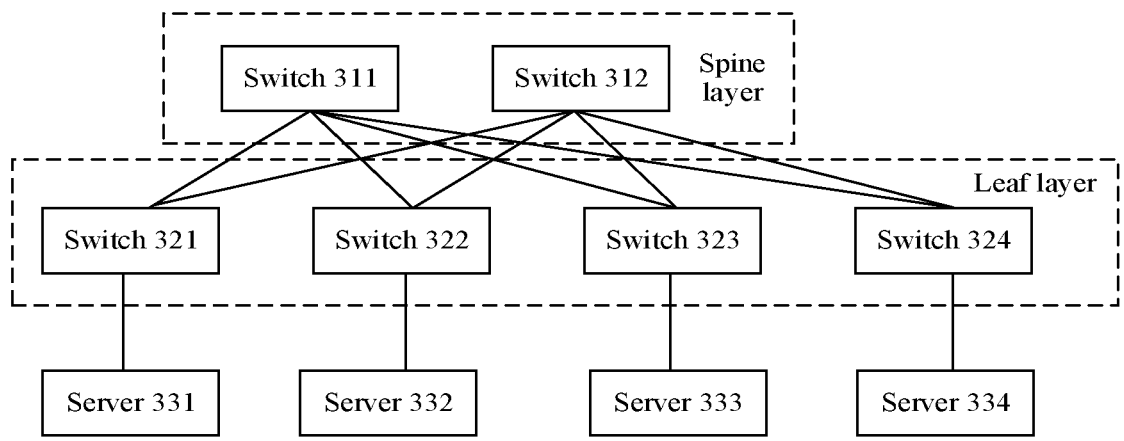
FIG. 3 is a schematic diagram of a structure of another data center network to which technical solutions in this application may be applied.

FIG. 3 is a schematic diagram of a structure of another data center network to which technical solutions in this application may be applied. The data center network shown in FIG. 3 is a data center network with a two-layer structure. The two-layer network includes a spine layer and a leaf layer.

In the data center network shown in FIG. 3, the spine layer includes a switch 311 and a switch 312, and the leaf layer includes a switch 321, a switch 322, a switch 323, and a switch 324. The switch 321 is connected to a server 331, the switch 322 is connected to a server 332, the switch 323 is connected to a server 333, and the switch 324 is connected to a server 334.

It may be understood that FIG. 3 is merely an example of a data center network with a two-layer structure, but is not a limitation on a data center network with a two-layer structure. For example, the data center network with the two-layer structure may further include more switches and/or servers, or may include fewer switches and/or servers. In addition, a connection relationship between switches and/or a connection relationship between a server and a switch in the data center network with the two-layer structure may be another connection manner other than that shown in FIG. 3.

Figure 4:
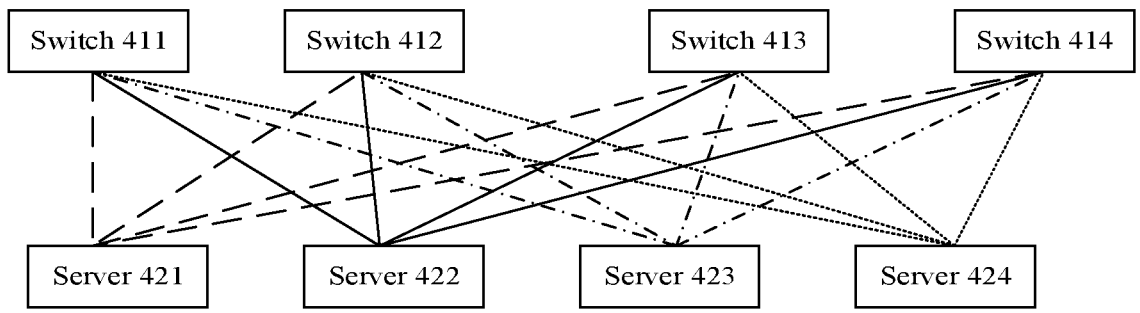
FIG. 4 is a schematic diagram of a structure of another data center network to which technical solutions in this application may be applied.

FIG. 4 is a schematic diagram of a structure of another data center network to which technical solutions in this application may be applied. The data center network shown in FIG. 4 is a data center network with a single-layer structure.

The data center network shown in FIG. 4 includes a switch 411, a switch 412, a switch 413, and a switch 414. As shown in FIG. 4, each switch in the data center network is connected to all servers. For example, the switch 411 is connected to a server 421, a server 422, a server 423, and a server 424. For another example, the switch 412 is connected to the server 421 to the server 424, the switch 413 is connected to the server 421 to the server 424, and the switch 414 is connected to the server 421 to the server 424.

Figure 5:
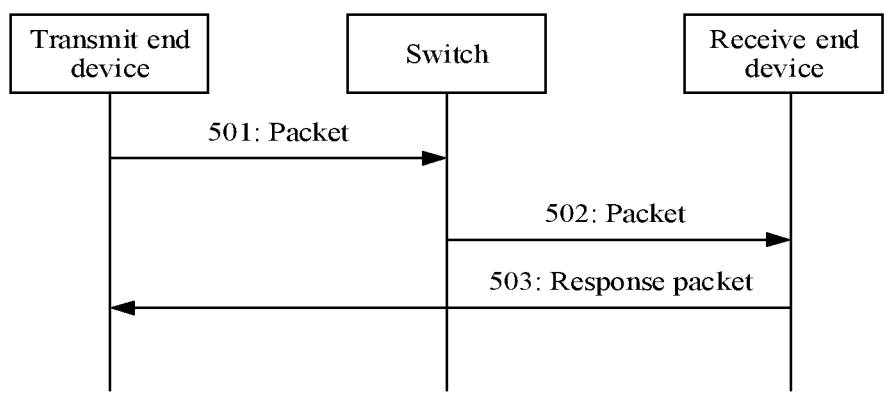
FIG. 5 is a schematic diagram of performing congestion control by using ECN.

FIG. 5 is a schematic diagram of performing congestion control by using an ECN. A "switch" mentioned in FIG. 5 may be a specific switch in FIG. 2 to FIG. 4, a "transmit end device" mentioned in FIG. 5 may be a specific server in FIG. 2 to FIG. 4, and a "receive end device" mentioned in FIG. 5 may be a specific server in FIG. 2 to FIG. 4. Certainly, the transmit end device and the receive end device may alternatively be other devices that communicate with each other by using one or more switches in FIG. 2 to FIG. 4.

501: The transmit end device sends a packet to the switch.

Correspondingly, the switch receives the packet from the transmit end device.

An IP header of the packet may include an ECN indication field. A value of the ECN indication field is a value used to indicate "no", that is, to indicate that no network congestion occurs. For example, if the value of the ECN indication field is 10 or 01, it indicates that no network congestion occurs.

502: The switch forwards the packet to the receive end device.

Correspondingly, the receive end device receives the packet from the switch.

If no network congestion occurs on the switch or a queue length of the switch is less than or equal to Kmin, the switch may directly send the packet to the receive end device.

If network congestion occurs on the switch and the queue length is greater than Kmin and less than Kmax, the switch performs ECN marking on a packet in a queue based on an ECN marking probability.

If network congestion occurs on the switch and the queue length is greater than or equal to Kmax, the switch performs ECN marking on the packet.

Assuming that the packet is a marked packet, a value of an ECN indication field in an IP header of the packet is value used to indicate "yes", that is, to indicate that network congestion occurs. For example, if the value of the ECN indication field is 11, it indicates that network congestion occurs.

In other words, if the switch performs ECN marking on the packet, the switch updates the value of the ECN indication field in the IP header of the packet from 10 or 01 to 11.

For ease of description, it is assumed that the packet is a packet on which ECN marking is performed below.

503: The receive end device sends a response packet to the transmit end device.

Correspondingly, the transmit end device receives the response packet from the receive end device.

The response packet may be forwarded by the switch. In other words, the receive end device sends the response packet to the switch, and the switch directly forwards the response packet to the transmit end device.

For example, the response packet may be a congestion notification packet (CNP), and a value of an ECN indication field in an IP header of the CNP may be 01.

After receiving the response packet, the transmit end device may reduce a rate of sending a packet to the switch.

For example, after receiving the response packet, the transmit end device may determine a new packet sending rate according to a formula 1.1:

$$CR=TR\times(1-a/2), \quad \text{Formula 1.1.}$$

TR represents a packet sending rate used before the response packet is received, CR represents an adjusted sending rate, a is a preset parameter, and a value of a may be greater than or equal to 1.

After the packet sending rate is reduced, if the transmit end device continues to receive a response packet from the receive end device, the transmit end device may continue to reduce the packet sending rate.

In some embodiments, if the transmit end device does not continue to receive a response packet from the receive end device (for example, does not receive a response packet from the receive end device within a preset time length), the transmit end device may increase the packet sending rate.

An operating environment of a data center network may change at any time, and ECN configuration information may not be applied to all operating environments. Therefore, if the ECN configuration information is fixed, the data center network may not adapt to all the operating environments.

Figure 6A:
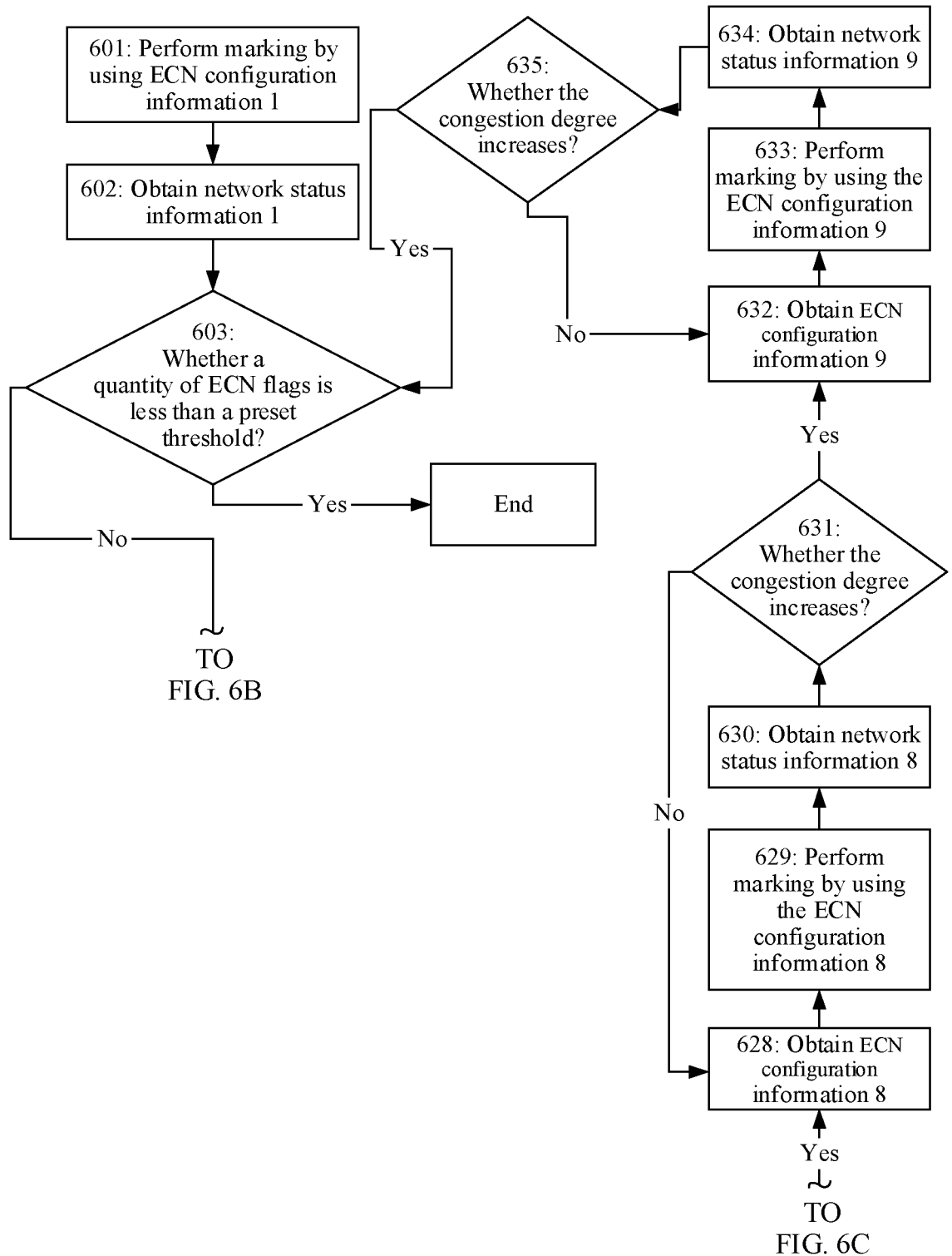
FIG. 6A to FIG. 6C show a network congestion processing method according to an embodiment of this application.
Figure 6B:
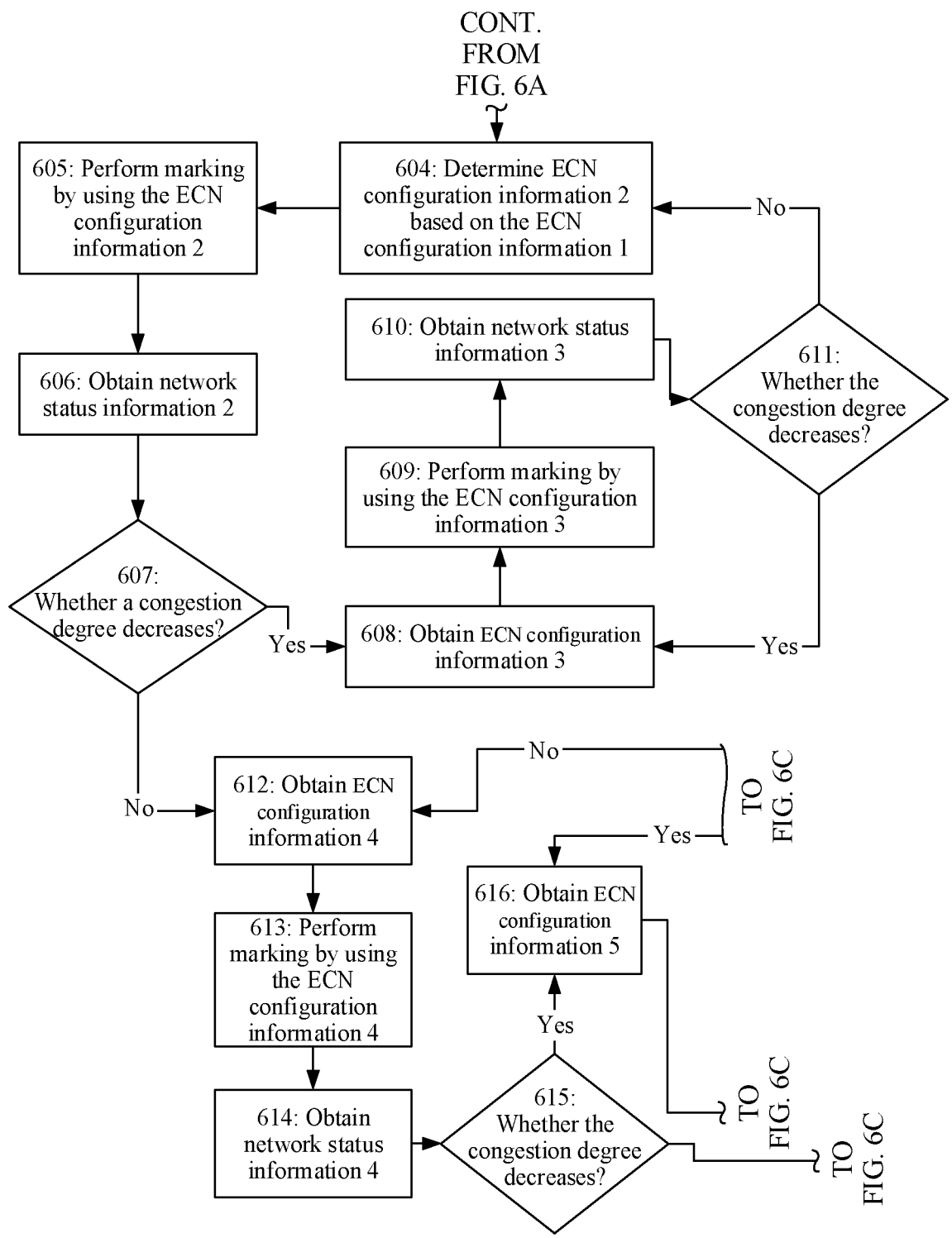
Figure 6C:
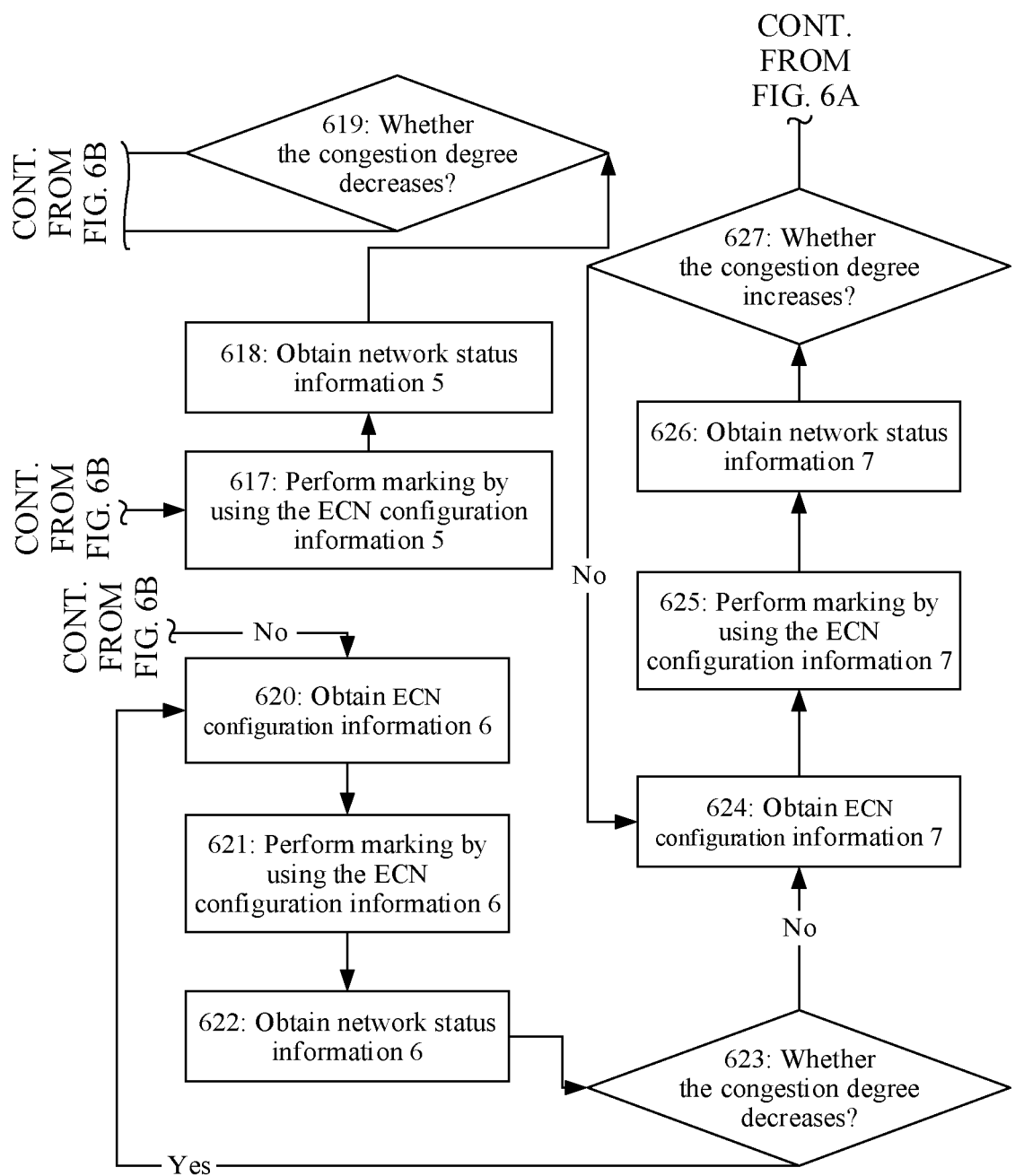

FIG. 6A to FIG. 6C show a network congestion processing method according to an embodiment of this application. The method shown in FIG. 6A to FIG. 6C may be applied to any data center network in FIG. 2 to FIG. 4. The method shown in FIG. 6A to FIG. 6C may be performed by a switch, or may be performed by a component (for example, a chip or a circuit) in the switch. For ease of description, the following describes the method shown in FIG. 6A to FIG. 6C by using a switch as an example. The switch may be a switch connected to a server in the network shown in FIG. 2 to FIG. 4, for example, an access layer switch in the data center network shown in FIG. 2, or a leaf layer switch in the data center network shown in FIG. 3.

601: The switch performs ECN marking on a packet by using ECN configuration information 1.

For ease of description, in the ECN configuration information 1, an upper ECN threshold may be denoted as Kmax_1, a lower ECN threshold is Kmin_1, and a maximum ECN marking probability is Pmax_1.

602: The switch obtains network status information 1.

The switch performs ECN marking on the packet based on the ECN configuration information 1. Therefore, the network status information 1 is obtained through statistics collection when the switch performs ECN marking on the packet by using the ECN configuration information 1.

The ECN configuration information may include information used to indicate network traffic (which may be referred to as network traffic information) and information used to indicate congestion (which may be referred to as network congestion information). For example, the network traffic information may include any one or more of a bandwidth utilization, a quantity of transmitted bytes, a total quantity of transmitted packets, and an average quantity of packets. The network congestion information may include any one or more of a quantity of ECN marked packets, a quantity of priority-based flow control received frames, a quantity of priority-based flow control transmitted frames, an ECN marking rate (that is, a quantity of packets marked per unit of time (for example, per second)), and a queue depth (that is, a quantity of to-be-forwarded packets).

Optionally, in some embodiments, the bandwidth utilization, the quantity of transmitted bytes, and/or the total quantity of transmitted packets in the network traffic information may be a concept of "total" obtained by the switch through statistics collection within a period of time. In other words, the bandwidth utilization may be a total bandwidth utilization within a period of time, the quantity of transmitted bytes may be a total quantity of transmitted bytes within a period of time, and the total quantity of transmitted packets may be a total quantity of transmitted packets within a period of time. Similarly, the quantity of ECN marked packets, the quantity of priority-based flow control received frames, the quantity of priority-based flow control transmitted frames, and/or the queue depth in the network congestion information may be a concept of "total" obtained by the switch through statistics collection within a period of time. In other words, the quantity of ECN marked packets may be a total quantity of ECN marked packets within a period of time, the quantity of priority-based flow control received frames may be a quantity of priority-based flow control received frames within a period of time, the quantity of priority-based flow control transmitted frames may be a total quantity of priority-based flow control transmitted frames within a period of time, and the queue depth may be a total queue depth within a period of time.

Optionally, in some other embodiments, the bandwidth utilization, the quantity of transmitted bytes, and/or the total quantity of transmitted packets in the network traffic information may be a concept of "per unit of time" determined by the switch based on a notification time and a total quantity obtained through statistics collection. In other words, the bandwidth utilization may be a bandwidth utilization per unit of time, the quantity of transmitted bytes may be a quantity of transmitted bytes per unit of time, and the total quantity of transmitted packets may be a total quantity of transmitted packets per unit of time. Similarly, the quantity of ECN marked packets, the quantity of priority-based flow control received frames, the quantity of priority-based flow control transmitted frames, and/or the queue depth in the network congestion information may be a concept of "per unit of time" determined by the switch based on a notification time and a total quantity obtained through statistics collection. In other words, the quantity of ECN marked packets may be a quantity of ECN marked packets per unit of time, the quantity of priority-based flow control received frames may be a quantity of priority-based flow control received frames per unit of time, the quantity of priority-based flow control transmitted frames may be a quantity of priority-based flow control transmitted frames per unit of time, and the queue depth may be a total queue depth per unit of time.

The network status information 1 may be obtained by the switch through statistics collection after a specific period of time after the switch starts to perform ECN marking on the packet by using the ECN configuration information 1. For example, assuming that the switch starts to perform ECN marking on the packet by using the ECN configuration information 1 at a moment t1, the switch may collect statistics about network status information (that is, the network status information 1) at a moment t1+T1. From the moment t1 to the moment t1+T1, the switch always performs ECN marking on the packet by using the ECN configuration information 1. T1 may be a preset value.

603: The switch may determine whether a quantity of ECN marked packets in the network status information 1 is less than a preset threshold.

If the quantity of ECN marked packets is less than the preset threshold, the switch may continue to perform ECN marking on the packet by using the ECN configuration information 1, and an adjustment procedure of the ECN configuration information ends.

If the quantity of ECN marked packets is greater than or equal to the preset threshold, step 604 may be performed.

604: The switch determines ECN configuration information 2 based on the ECN configuration information 1.

For ease of description, in the ECN configuration information 2, an upper ECN threshold may be denoted as Kmax_2, a lower ECN threshold is Kmin_2, and a maximum ECN marking probability is Pmax_2.

The ECN configuration information 1 has the following relationship with the ECN configuration information 2: Kmax_1<Kmax_2, Kmin_1=Kmin_2, and Pmax_1=Pmax_2.

In other words, the switch may increase the upper ECN threshold in the ECN configuration information 1, and keep the lower ECN threshold and the maximum ECN marking probability in the ECN configuration information 1 unchanged.

605: The switch performs ECN marking on the packet by using the ECN configuration information 2.

606: The switch obtains network status information 2.

The switch performs ECN marking on the packet based on the ECN configuration information 2. Therefore, the network status information 2 is obtained through statistics collection when the switch performs ECN marking on the packet by using the ECN configuration information 2.

Similar to the network status information 1, the network status information 2 may be obtained by the switch through statistics collection after a specific period of time after the switch starts to perform ECN marking on the packet by using the ECN configuration information 2. For example, assuming that the switch starts to perform ECN marking on the packet by using the ECN configuration information 2 at a moment t2, the switch may collect statistics about network status information (that is, the network status information 2) at a moment t2+T2. From the moment t2 to the moment t2+T2, the switch always performs ECN marking on the packet by using the ECN configuration information 2. T2 may be a preset value. In some embodiments, a value of T1 may be equal to that of T2. In some other embodiments, a value of T1 may not be equal to that of T2.

607: The switch determines whether a congestion degree of the switch decreases.

The switch may determine, based on the network status information 2 and the network status information 1, whether the congestion degree of the switch decreases.

In some embodiments, the switch determines, based on a change in a queue depth, whether the congestion degree of the switch decreases.

For example, if T1 is equal to T2, the switch may determine, based on a queue depth in the network status information 1 and a queue depth in the network status information 2, whether the congestion degree of the switch decreases. If the queue depth decreases (that is, the queue depth in the network status information 2 is less than the queue depth in the network status information 1), it indicates that a quantity of to-be-forwarded packets decreases. In this case, the switch may determine that the congestion degree of the switch decreases. If the queue depth remains unchanged or increases (the queue depth in the network status information 2 is greater than or equal to the queue depth in the network status information 1), the switch may determine that the congestion degree of the switch does not decrease.

For another example, if T1 is not equal to T2, the switch may determine, by using values of T1 and T2, and the queue depths in the network status information 1 and the network status information 2, whether the congestion degree of the switch decreases. Assuming that the queue depth in the network status information 1 is L1, and the queue depth in the network status information 2 is L2, the switch may determine whether L1/T1 is greater than L2/T2. If L1/T1 is less than or equal to L2/T2, it indicates that the congestion degree of the switch does not decrease. If L1/T1 is greater than L2/T2, it indicates that the congestion degree of the switch decreases.

In some other embodiments, the switch may determine, based on a quantity of ECN marked packets, whether the congestion degree of the switch decreases.

For example, if T1 is equal to T2, the switch may determine, based on a quantity of ECN marked packets in the network status information 1 and a quantity of ECN marked packets in the network status information 2, whether the congestion degree of the switch decreases. An ECN marking probability may be directly proportional to the queue depth. To be specific, if the queue depth increases, the ECN marking probability increases, and correspondingly, the quantity of ECN marked packets increases in a same period of time. If the queue depth decreases, the ECN marking probability decreases, and correspondingly, the quantity of ECN marked packets decreases in a same period of time. Therefore, if the quantity of ECN marked packets decreases (that is, the quantity of ECN marked packets in the network status information 2 is less than the quantity of ECN marked packets in the network status information 1), it indicates that the ECN marking probability decreases, and correspondingly, a quantity of to-be-forwarded packets decreases. In this case, the switch may determine that the congestion degree of the switch decreases. If the quantity of ECN marked packets remains unchanged or increases (the quantity of ECN marked packets in the network status information 2 is greater than or equal to the quantity of ECN marked packets in the network status information 1), the switch may determine that the congestion degree of the switch does not decrease.

For another example, if T1 is not equal to T2, the switch may determine a quantity of ECN marked packets per unit of time (which may be referred to as an ECN marking rate 1 for short) based on T1 and the quantity of ECN marked packets in the network status information 1, and determine a quantity of ECN marked packets per unit of time (which may be referred to as an ECN marking rate 2 for short) based on T2 and the quantity of ECN marked packets in the network status information 2. If the ECN marking rate 1 is greater than the ECN marking rate 2, it indicates that the congestion degree of the switch decreases. If the ECN marking rate 1 is less than or equal to the ECN marking rate 2, it indicates that the congestion degree of the switch does not decrease.

In some other embodiments, the switch may determine, based on a quantity of transmitted bytes, whether the congestion degree of the switch decreases.

For example, if T1 is equal to T2, the switch may determine, based on a quantity of transmitted bytes in the network status information 1 and a quantity of transmitted bytes in the network status information 2, whether the congestion degree of the switch decreases. If a network congestion degree decreases, a quantity of bytes transmitted in a same period of time should increase. Therefore, if the quantity of transmitted bytes increases (that is, the quantity of transmitted bytes in the network status information 2 is greater than the quantity of transmitted bytes in the network status information 1), the switch may determine that the congestion degree of the switch decreases. If the quantity of transmitted bytes remains unchanged or decreases (the quantity of transmitted bytes in the network status information 2 is equal to or less than the quantity of transmitted bytes in the network status information 1), the switch may determine that the congestion degree of the switch does not decrease.

For another example, if T1 is not equal to T2, the switch may determine a quantity of transmitted bytes per unit of time (which may be referred to as a transmission rate 1 for short) based on T1 and the quantity of transmitted bytes in the network status information 1, and determine a quantity of transmitted bytes per unit of time (which may be referred to as a transmission rate 2 for short) based on T2 and the quantity of transmitted bytes in the network status information 2. If the transmission rate 1 is less than the transmission rate 2, it indicates that the congestion degree of the switch decreases. If the transmission rate 1 is greater than or equal to the transmission rate 2, it indicates that the congestion degree of the switch does not decrease.

The switch may further determine, based on one or more pieces of other information in the network status information 1 and the network status information 2, whether the congestion degree of the switch decreases. No enumeration is provided herein.

If a determining result of step 607 is yes (that is, the congestion degree of the switch decreases), step 608 is performed.

If the determining result of step 607 is no (that is, the congestion degree of the switch does not decrease), step 612 is performed.

The decrease of the congestion degree of the switch may be referred to as positive feedback of network status information. The increase of the congestion degree of the switch may be referred to as negative feedback of network status information.

608: The switch determines ECN configuration information 3 based on the ECN configuration information 2.

For ease of description, in the ECN configuration information 3, an upper ECN threshold may be denoted as Kmax_3, a lower ECN threshold is Kmin_3, and a maximum ECN marking probability is Pmax_3.

The ECN configuration information 2 has the following relationship with the ECN configuration information 3: Kmax_2<Kmax_3, Kmin_2<Kmin_3, and Pmax_2=Pmax_3.

In other words, the switch may increase the upper ECN threshold and the lower ECN threshold in the ECN configuration information 2, and keep the maximum ECN marking probability in the ECN configuration information 2 unchanged.

609: The switch performs ECN marking on the packet by using the ECN configuration information 3.

610: The switch obtains network status information 3.

The switch performs ECN marking on the packet based on the ECN configuration information 3. Therefore, the network status information 3 is obtained through statistics collection when the switch performs ECN marking on the packet by using the ECN configuration information 3.

Similar to the network status information 1, the network status information 3 may be obtained by the switch through statistics collection after a specific period of time after the switch starts to perform ECN marking on the packet by using the ECN configuration information 3. For example, assuming that the switch starts to perform ECN marking on the packet by using the ECN configuration information 3 at a moment t3, the switch may collect statistics about network status information (that is, the network status information 3) at a moment t3+T3. From the moment t3 to the moment t3+T3, the switch always performs ECN marking on the packet by using the ECN configuration information 3. T3 may be a preset value. In some embodiments, a value of T3 may be equal to that of T2. In some other embodiments, a value of T3 may not be equal to that of T2.

611: The switch determines whether the congestion degree of the switch decreases.

The switch may determine, based on the network status information 2 and the network status information 3, whether the congestion degree of the switch decreases.

A specific implementation in which the switch may determine, based on the network status information 2 and the network status information 3, whether the congestion degree of the switch decreases is similar to a specific implementation in which the switch determines, based on the network status information 1 and the network status information 2, whether the congestion degree of the switch decreases. For brevity, details are not described herein again.

If a determining result of step 611 is yes (that is, the congestion degree of the switch decreases), the switch may increase the upper ECN threshold and the lower ECN threshold in the ECN configuration information 3, and keep the maximum ECN marking probability in the ECN configuration information 3 unchanged. Then, the switch may perform ECN marking on the packet by using adjusted ECN configuration information, continue to obtain corresponding network status information, and determine, based on the network status information and the network status information 3, whether the congestion degree of the switch decreases. In other words, if the determining result of step 611 is yes, steps performed by the switch are similar to step 608 to step 611. To be specific, the switch determines ECN configuration information 3-1 based on the ECN configuration information 3, marks the packet by using the ECN configuration 3-1, obtains network status information 3-1, and determines whether the congestion degree of the switch decreases. A determining manner in which the switch determines the ECN configuration information 3-1 based on the ECN configuration information 3 is the same as a determining manner in which the switch determines the ECN configuration information 3 based on the ECN configuration information 2. A specific determining manner in which the switch determines, based on the network status information 3 and the network status information 3-1, whether the congestion degree of the switch decreases is the same as a specific determining manner in which the switch determines, based on the network status information 2 and the network status information 3, whether the congestion degree of the switch decreases.

If the determining result of step 611 is no (that is, the congestion degree of the switch does not decrease), the switch may increase the upper ECN threshold in the ECN configuration information 3, and keep the lower ECN threshold and the maximum ECN marking probability in the ECN configuration information 3 unchanged. Then, the switch may perform ECN marking on the packet by using adjusted ECN configuration information, continue to obtain corresponding network status information, and determine, based on the network status information and the network status information 3, whether the congestion degree of the switch decreases. In other words, if the determining result of step 611 is no, steps performed by the switch are similar to step 604 to step 607. To be specific, the switch determines ECN configuration information 3-2 based on the ECN configuration information 3, marks the packet by using the ECN configuration 3-2, obtains network status information 3-2, and determines whether the congestion degree of the switch decreases. A determining manner in which the switch determines the ECN configuration information 3-2 based on the ECN configuration information 3 is the same as a determining manner in which the switch determines the ECN configuration information 2 based on the ECN configuration information 1. A specific determining manner in which the switch determines, based on the network status information 3 and the network status information 3-2, whether the congestion degree of the switch decreases is the same as a specific determining manner in which the switch determines, based on the network status information 1 and the network status information 2, whether the congestion degree of the switch decreases.

612: The switch determines ECN configuration information 4 based on the ECN configuration information 2.

For ease of description, in the ECN configuration information 4, an upper ECN threshold may be denoted as $Kmax\_4$, a lower ECN threshold is $Kmin\_4$, and a maximum ECN marking probability is $Pmax\_4$.

The ECN configuration information 4 has the following relationship with the ECN configuration information 2: $Kmax\_2 = Kmax\_4$, $Kmin\_2 < Kmin\_4$, and $Pmax\_2 = Pmax\_4$.

In other words, the switch may increase the lower ECN threshold in the ECN configuration information 2, and keep the upper ECN threshold and the maximum ECN marking probability in the ECN configuration information 2 unchanged.

613: The switch performs ECN marking on the packet by using the ECN configuration information 4.

614: The switch obtains network status information 4.

The switch performs ECN marking on the packet based on the ECN configuration information 4. Therefore, the network status information 4 is obtained through statistics collection when the switch performs ECN marking on the packet by using the ECN configuration information 4.

Similar to the network status information 1, the network status information 4 may be obtained by the switch through statistics collection after a specific period of time after the switch starts to perform ECN marking on the packet by using the ECN configuration information 4. For example, assuming that the switch starts to perform ECN marking on the packet by using the ECN configuration information 4 at a moment t4, the switch may collect statistics about network status information (that is, the network status information 3) at a moment t4+T4. From the moment t4 to the moment t4+T4, the switch always performs ECN marking on the packet by using the ECN configuration information 4. T4 may be a preset value. In some embodiments, a value of T4 may be equal to that of T2. In some other embodiments, a value of T4 may not be equal to that of T2.

615: The switch determines whether the congestion degree of the switch decreases.

The switch may determine, based on the network status information 2 and the network status information 4, whether the congestion degree of the switch decreases.

A specific implementation in which the switch may determine, based on the network status information 2 and the network status information 4, whether the congestion degree of the switch decreases is similar to a specific implementation in which the switch determines, based on the network status information 1 and the network status information 2, whether the congestion degree of the switch decreases. For brevity, details are not described herein again.

If a determining result of step 615 is yes (that is, the congestion degree of the switch decreases), step 616 is performed.

If the determining result of step 615 is no (that is, the congestion degree of the switch does not decrease), step 620 is performed.

616: The switch determines ECN configuration information 5 based on the ECN configuration information 4.

For ease of description, in the ECN configuration information 5, an upper ECN threshold may be denoted as Kmax_5, a lower ECN threshold is Kmin_5, and a maximum ECN marking probability is Pmax_5.

The ECN configuration information 4 has the following relationship with the ECN configuration information 5: Kmax_4=Kmax_5, Kmin_4<Kmin_5, and Pmax_4>Pmax_5.

In other words, the switch may increase the lower ECN threshold in the ECN configuration information 4, decrease the maximum ECN marking probability in the ECN configuration information 4, and keep the upper ECN threshold in the ECN configuration information 4 unchanged.

617: The switch performs ECN marking on the packet by using the ECN configuration information 5.

618: The switch obtains network status information 5.

The switch performs ECN marking on the packet based on the ECN configuration information 5. Therefore, the network status information 5 is obtained through statistics collection when the switch performs ECN marking on the packet by using the ECN configuration information 5.

Similar to the network status information 1, the network status information 5 may be obtained by the switch through statistics collection after a specific period of time after the switch starts to perform ECN marking on the packet by using the ECN configuration information 5. For example, assuming that the switch starts to perform ECN marking on the packet by using the ECN configuration information 5 at a moment t5, the switch may collect statistics about network status information (that is, the network status information 5) at a moment t5+T5. From the moment t5 to the moment t5+T5, the switch always performs ECN marking on the packet by using the ECN configuration information 5. T5 may be a preset value. In some embodiments, a value of T5 may be equal to that of T4. In some other embodiments, a value of T5 may not be equal to that of T4.

619: The switch determines whether the congestion degree of the switch decreases.

The switch may determine, based on the network status information 4 and the network status information 5, whether the congestion degree of the switch decreases.

A specific implementation in which the switch may determine, based on the network status information 4 and the network status information 5, whether the congestion degree of the switch decreases is similar to a specific implementation in which the switch determines, based on the network status information 1 and the network status information 2, whether the congestion degree of the switch decreases. For brevity, details are not described herein again.

If a determining result of step 619 is yes (that is, the congestion degree of the switch decreases), the switch may increase the lower ECN threshold in the ECN configuration information 5, decrease the maximum ECN marking probability in the ECN configuration information 5, and keep the upper ECN threshold in the ECN configuration information 5 unchanged. Then, the switch may perform ECN marking on the packet by using adjusted ECN configuration information, continue to obtain corresponding network status information, and determine, based on the network status information and the network status information 5, whether the congestion degree of the switch decreases. In other words, if the determining result of step 619 is yes, steps performed by the switch are similar to step 616 to step 619. To be specific, the switch determines ECN configuration information 5-1 based on the ECN configuration information 5, marks the packet by using the ECN configuration 5-1, obtains network status information 5-1, and determines whether the congestion degree of the switch decreases. A determining manner in which the switch determines the ECN configuration information 5-1 based on the ECN configuration information 5 is the same as a determining manner in which the switch determines the ECN configuration information 5 based on the ECN configuration information 4. A specific determining manner in which the switch determines, based on the network status information 5 and the network status information 5-1, whether the congestion degree of the switch decreases is the same as a specific determining manner in which the switch determines, based on the network status information 4 and the network status information 5, whether the congestion degree of the switch decreases.

If the determining result of step 619 is no (that is, the congestion degree of the switch does not decrease), the switch may increase the lower ECN threshold in the ECN configuration information 5, and keep the upper ECN threshold and the maximum ECN marking probability in the ECN configuration information 5 unchanged. Then, the switch may perform ECN marking on the packet by using adjusted ECN configuration information, continue to obtain corresponding network status information, and determine, based on the network status information and the network status information 5, whether the congestion degree of the switch decreases. In other words, if the determining result of step 619 is no, steps performed by the switch are similar to step 612 to step 615. To be specific, the switch determines ECN configuration information 5-2 based on the ECN configuration information 5, marks the packet by using the ECN configuration 5-2, obtains network status information 5-2, and determines whether the congestion degree of the switch decreases. A determining manner in which the switch determines the ECN configuration information 5-2 based on the ECN configuration information 5 is the same as a determining manner in which the switch determines the ECN configuration information 4 based on the ECN configuration information 2. A specific determining manner in which the switch determines, based on the network status information 5 and the network status information 5-2, whether the congestion degree of the switch decreases is the same as a specific determining manner in which the switch determines, based on the network status information 2 and the network status information 4, whether the congestion degree of the switch decreases.

620: The switch determines ECN configuration information 6 based on the ECN configuration information 4.

For ease of description, in the ECN configuration information 6, an upper ECN threshold may be denoted as $Kmax\_6$, a lower ECN threshold is $Kmin\_6$, and a maximum ECN marking probability is $Pmax\_6$.

The ECN configuration information 4 has the following relationship with the ECN configuration information 6: $Kmax\_4=Kmax\_6$, $Kmin\_4=Kmin\_5$, and $Pmax\_4>Pmax\_6$.

In other words, the switch may decrease the maximum ECN marking probability in the ECN configuration information 4, and keep the lower ECN threshold and the upper ECN threshold in the ECN configuration information 4 unchanged.

621: The switch performs ECN marking on the packet by using the ECN configuration information 6.

622: The switch obtains network status information 6.

The switch performs ECN marking on the packet based on the ECN configuration information 6. Therefore, the network status information 6 is obtained through statistics collection when the switch performs ECN marking on the packet by using the ECN configuration information 6.

Similar to the network status information 1, the network status information 6 may be obtained by the switch through statistics collection after a specific period of time after the switch starts to perform ECN marking on the packet by using the ECN configuration information 6. For example, assuming that the switch starts to perform ECN marking on the packet by using the ECN configuration information 6 at a moment t6, the switch may collect statistics about network status information (that is, the network status information 6) at a moment t6+T6. From the moment t6 to the moment t6+T6, the switch always performs ECN marking on the packet by using the ECN configuration information 6. T6 may be a preset value. In some embodiments, a value of T6 may be equal to that of T4. In some other embodiments, a value of T6 may not be equal to that of T4.

623: The switch determines whether the congestion degree of the switch decreases.

The switch may determine, based on the network status information 4 and the network status information 6, whether the congestion degree of the switch decreases.

A specific implementation in which the switch may determine, based on the network status information 4 and the network status information 6, whether the congestion degree of the switch decreases is similar to a specific implementation in which the switch determines, based on the network status information 1 and the network status information 2, whether the congestion degree of the switch decreases. For brevity, details are not described herein again.

If a determining result of step 623 is yes (that is, the congestion degree of the switch decreases), the switch may decrease the maximum ECN marking probability in the ECN configuration information 6, and keep the lower ECN threshold and the upper ECN threshold in the ECN configuration information 6 unchanged. Then, the switch may perform ECN marking on the packet by using adjusted ECN configuration information, continue to obtain corresponding network status information, and determine, based on the network status information and the network status information 6, whether the congestion degree of the switch decreases. In other words, if the determining result of step 623 is yes, steps performed by the switch are similar to step 620 to step 623. To be specific, the switch determines ECN configuration information 6-1 based on the ECN configuration information 6, marks the packet by using the ECN configuration 6-1, obtains network status information 6-1, and determines whether the congestion degree of the switch decreases. A determining manner in which the switch determines the ECN configuration information 6-1 based on the ECN configuration information 6 is the same as a determining manner in which the switch determines the ECN configuration information 6 based on the ECN configuration information 4. A specific determining manner in which the switch determines, based on the network status information 6 and the network status information 6-1, whether the congestion degree of the switch decreases is the same as a specific determining manner in which the switch determines, based on the network status information 4 and the network status information 6, whether the congestion degree of the switch decreases.

If the determining result of step 623 is no (that is, the congestion degree of the switch does not decrease), step 624 is performed.

624: The switch determines ECN configuration information 7 based on the ECN configuration information 6.

For ease of description, in the ECN configuration information 7, an upper ECN threshold may be denoted as $Kmax\_7$, a lower ECN threshold is $Kmin\_7$, and a maximum ECN marking probability is $Pmax\_7$.

The ECN configuration information 6 has the following relationship with the ECN configuration information 7: $Kmax\_6>Kmax\_7$, $Kmin\_6=Kmin\_7$, and $Pmax\_6=Pmax\_7$.

In other words, the switch may decrease the upper ECN threshold in the ECN configuration information 6, and keep the lower ECN threshold and the maximum ECN marking probability in the ECN configuration information 6 unchanged.

625: The switch performs ECN marking on the packet by using the ECN configuration information 7.

626: The switch obtains network status information 7.

The switch performs ECN marking on the packet based on the ECN configuration information 7. Therefore, the network status information 7 is obtained through statistics collection when the switch performs ECN marking on the packet by using the ECN configuration information 7.

Similar to the network status information 1, the network status information 7 may be obtained by the switch through statistics collection after a specific period of time after the switch starts to perform ECN marking on the packet by using the ECN configuration information 7. For example, assuming that the switch starts to perform ECN marking on the packet by using the ECN configuration information 7 at a moment t7, the switch may collect statistics about network status information (that is, the network status information 7) at a moment t7+T7. From the moment t7 to the moment t7+T7, the switch always performs ECN marking on the packet by using the ECN configuration information 7. T7 may be a preset value. In some embodiments, a value of T6 may be equal to that of T7. In some other embodiments, a value of T6 may not be equal to that of T7.

627: The switch determines whether the congestion degree of the switch increases.

The switch may determine, based on the network status information 6 and the network status information 7, whether the congestion degree of the switch increases.

A specific implementation in which the switch may determine, based on the network status information 6 and the network status information 7, whether the congestion degree of the switch increases is similar to a specific implementation in which the switch determines, based on the network status information 1 and the network status information 2, whether the congestion degree of the switch decreases. For brevity, details are not described herein again.

If a determining result of step 627 is no (that is, the congestion degree of the switch does not increase), the switch may decrease the upper ECN threshold in the ECN configuration information 7, and keep the lower ECN threshold and the maximum ECN marking probability in the ECN configuration information 7 unchanged. Then, the switch may perform ECN marking on the packet by using adjusted ECN configuration information, continue to obtain corresponding network status information, and determine, based on the network status information and the network status information 7, whether the congestion degree of the switch decreases. In other words, if the determining result of step 627 is no, steps performed by the switch are similar to step 624 to step 627. To be specific, the switch determines ECN configuration information 7-1 based on the ECN configuration information 7, marks the packet by using the ECN configuration 7-1, obtains network status information 7-1, and determines whether the congestion degree of the switch decreases. A determining manner in which the switch determines the ECN configuration information 7-1 based on the ECN configuration information 7 is the same as a determining manner in which the switch determines the ECN configuration information 7 based on the ECN configuration information 6. A specific determining manner in which the switch determines, based on the network status information 7 and the network status information 7-1, whether the congestion degree of the switch decreases is the same as a specific determining manner in which the switch determines, based on the network status information 6 and the network status information 7, whether the congestion degree of the switch decreases.

If the determining result of step 627 is yes (that is, the congestion degree of the switch increases), step 628 is performed.

628: The switch determines ECN configuration information 8 based on the ECN configuration information 7.

For ease of description, in the ECN configuration information 8, an upper ECN threshold may be denoted as Kmax_8, a lower ECN threshold is Kmin_8, and a maximum ECN marking probability is Pmax_8.

The ECN configuration information 7 has the following relationship with the ECN configuration information 8: Kmax_7=Kmax_8, Kmin_7>Kmin_8, and Pmax_7=Pmax_8.

In other words, the switch may decrease the lower ECN threshold in the ECN configuration information 7, and keep the upper ECN threshold and the maximum ECN marking probability in the ECN configuration information 7 unchanged.

629: The switch performs ECN marking on the packet by using the ECN configuration information 8.

630: The switch obtains network status information 8.

The switch performs ECN marking on the packet based on the ECN configuration information 8. Therefore, the network status information 8 is obtained through statistics collection when the switch performs ECN marking on the packet by using the ECN configuration information 8.

Similar to the network status information 1, the network status information 8 may be obtained by the switch through statistics collection after a specific period of time after the switch starts to perform ECN marking on the packet by using the ECN configuration information 8. For example, assuming that the switch starts to perform ECN marking on the packet by using the ECN configuration information 8 at a moment t8, the switch may collect statistics about network status information (that is, the network status information 8) at a moment t8+T8. From the moment t8 to the moment t8+T8, the switch always performs ECN marking on the packet by using the ECN configuration information 8. T8 may be a preset value. In some embodiments, a value of T8 may be equal to that of T7. In some other embodiments, a value of T8 may not be equal to that of T7.

631: The switch determines whether the congestion degree of the switch increases.

The switch may determine, based on the network status information 7 and the network status information 8, whether the congestion degree of the switch increases.

A specific implementation in which the switch may determine, based on the network status information 7 and the network status information 8, whether the congestion degree of the switch increases is similar to a specific implementation in which the switch determines, based on the network status information 1 and the network status information 2, whether the congestion degree of the switch decreases. For brevity, details are not described herein again.

If a determining result of step 631 is no (that is, the congestion degree of the switch does not increase), the switch may decrease the lower ECN threshold in the ECN configuration information 8, and keep the upper ECN threshold and the maximum ECN marking probability in the ECN configuration information 8 unchanged. Then, the switch may perform ECN marking on the packet by using adjusted ECN configuration information, continue to obtain corresponding network status information, and determine, based on the network status information and the network status information 8, whether the congestion degree of the switch decreases. In other words, if the determining result of step 631 is no, steps performed by the switch are similar to step 628 to step 631. To be specific, the switch determines ECN configuration information 8-1 based on the ECN configuration information 8, marks the packet by using the ECN configuration 8-1, obtains network status information 8-1, and determines whether the congestion degree of the switch decreases. A determining manner in which the switch determines the ECN configuration information 8-1 based on the ECN configuration information 8 is the same as a determining manner in which the switch determines the ECN configuration information 8 based on the ECN configuration information 7. A specific determining manner in which the switch determines, based on the network status information 8 and the network status information 8-1, whether the congestion degree of the switch decreases is the same as a specific determining manner in which the switch determines, based on the network status information 7 and the network status information 8, whether the congestion degree of the switch decreases.

If the determining result of step 631 is yes (that is, the congestion degree of the switch increases), step 632 is performed.

632: The switch determines ECN configuration information 9 based on the ECN configuration information 8.

For ease of description, in the ECN configuration information 9, an upper ECN threshold may be denoted as Kmax_9, a lower ECN threshold is Kmin_9, and a maximum ECN marking probability is Pmax_9.

The ECN configuration information 8 has the following relationship with the ECN configuration information 9: Kmax_8=Kmax_9, Kmin_8=Kmin_9, and Pmax_8<Pmax_9.

In other words, the switch may increase the maximum ECN marking probability in the ECN configuration information 8, and keep the upper ECN threshold and the lower ECN threshold in the ECN configuration information 8 unchanged.

633: The switch performs ECN marking on the packet by using the ECN configuration information 9.

634: The switch obtains network status information 9.

The switch performs ECN marking on the packet based on the ECN configuration information 9. Therefore, the network status information 9 is obtained through statistics collection when the switch performs ECN marking on the packet by using the ECN configuration information 9.

Similar to the network status information 1, the network status information 9 may be obtained by the switch through statistics collection after a specific period of time after the switch starts to perform ECN marking on the packet by using the ECN configuration information 9. For example, assuming that the switch starts to perform ECN marking on the packet by using the ECN configuration information 9 at a moment t9, the switch may collect statistics about network status information (that is, the network status information 9) at a moment t9+T9. From the moment t9 to the moment t9+T9, the switch always performs ECN marking on the packet by using the ECN configuration information 9. T9 may be a preset value. In some embodiments, a value of T8 may be equal to that of T9. In some other embodiments, a value of T8 may not be equal to that of T9.

635: The switch determines whether the congestion degree of the switch increases.

The switch may determine, based on the network status information 8 and the network status information 9, whether the congestion degree of the switch increases.

A specific implementation in which the switch may determine, based on the network status information 8 and the network status information 9, whether the congestion degree of the switch increases is similar to a specific implementation in which the switch determines, based on the network status information 1 and the network status information 2, whether the congestion degree of the switch decreases. For brevity, details are not described herein again.

If a determining result of step 635 is no (that is, the congestion degree of the switch does not increase), the switch may increase the maximum ECN marking probability in the ECN configuration information 9, and keep the upper ECN threshold and the lower ECN threshold in the ECN configuration information 9 unchanged. Then, the switch may perform ECN marking on the packet by using adjusted ECN configuration information, continue to obtain corresponding network status information, and determine, based on the network status information and the network status information 9, whether the congestion degree of the switch decreases. In other words, if the determining result of step 635 is no, steps performed by the switch are similar to step 632 to step 635. To be specific, the switch determines ECN configuration information 9-1 based on the ECN configuration information 9, marks the packet by using the ECN configuration 9-1, obtains network status information 9-1, and determines whether the congestion degree of the switch decreases. A determining manner in which the switch determines the ECN configuration information 9-1 based on the ECN configuration information 9 is the same as a determining manner in which the switch determines the ECN configuration information 9 based on the ECN configuration information 8. A specific determining manner in which the switch determines, based on the network status information 9 and the network status information 9-1, whether the congestion degree of the switch decreases is the same as a specific determining manner in which the switch determines, based on the network status information 8 and the network status information 9, whether the congestion degree of the switch decreases.

If the determining result of step 635 is yes (that is, the congestion degree of the switch increases), it may be determined whether a quantity of ECN marked packets in the network status information 9 is less than a preset threshold. If the quantity of ECN marked packets in the network status information 9 is less than the preset threshold, the switch may continue to perform ECN marking on the packet by using the ECN configuration information 9. If the quantity of ECN marked packets in the network status information 9 is greater than or equal to the preset threshold, the switch may increase the upper ECN threshold in the ECN configuration information 9, and keep the lower ECN threshold and the maximum ECN marking probability in the ECN configuration information 9 unchanged. Then, the switch may perform ECN marking on the packet by using adjusted ECN configuration information, continue to obtain corresponding network status information, and determine, based on the network status information and the network status information 9, whether the congestion degree of the switch decreases. In other words, if the determining result of step 635 is yes, a step performed by the switch is similar to step 603. The switch may continue to determine the ECN configuration information by referring to step 603.

In the foregoing steps, the ECN configuration information determined by the switch may be finally converged to the ECN configuration information 9, and the adjustment procedure of the ECN configuration information ends. If the ECN configuration information is not converged to the ECN configuration information 9, the switch may repeat the method shown in FIG. 6A to FIG. 6C until the ECN configuration information is finally converged, and the adjustment procedure of the ECN configuration information ends. In other words, in this case, the ECN configuration information in step 601 is the ECN configuration information 9 obtained in the previous adjustment process.

If step 601 is performed for the first time, that is, the ECN configuration information in step 601 is not the ECN configuration information 9 obtained in the previous adjustment process, the ECN configuration information 1 may be referred to as initial ECN configuration information. The initial ECN configuration information may be a preset value.

In the procedure shown in FIG. 6A to FIG. 6C, the upper ECN threshold in the ECN configuration information is increased for a plurality of times. For example, in step 604, the switch obtains the ECN configuration information 2 by increasing the upper ECN threshold in the ECN configuration information 1. In step 608, the switch also obtains the ECN configuration information 3 by increasing the upper ECN threshold in the ECN configuration information 2. For ease of description, it is assumed below that Kmax_1, Kmax_2, and Kmax_3 have the following relationships:

$$K\text{max}\_2 = K\text{max}\_1 + \Delta_{12}, \text{ and}$$

$$K\text{max}\_3 = K\text{max}\_2 + \Delta_{23}.$$

To be specific, the upper ECN threshold in the ECN configuration information 2 is obtained after the upper ECN threshold in the ECN configuration information 1 is increased by $\Delta_{12}$, and the upper ECN threshold in the ECN configuration information 3 is obtained after the upper ECN threshold in the ECN configuration information 2 is increased by $\Delta_{23}$. Herein, $\Delta_{12}$ and $\Delta_{23}$ are numbers greater than 0.

Optionally, in some embodiments, the upper ECN threshold is increased according to a preset value with a same amplitude. In other words, $\Delta_{12}$ is equal to $\Delta_{23}$.

Optionally, in some other embodiments, the upper ECN threshold is increased according to a preset value with different amplitudes. In other words, $\Delta_{12}$ is not equal to $\Delta_{23}$.

Optionally, in some other embodiments, the upper ECN threshold is increased according to a preset proportion with a same proportion. For example, $\Delta_{12}=Kmax\_1 \times k\ \%$, and $\Delta_{23}=Kmax\_2 \times k\ \%$, where k is a number greater than 0.

Optionally, in some other embodiments, the upper ECN threshold is increased according to a preset proportion with different proportions. For example, $\Delta_{12}=Kmax\_1 \times k_1\%$, and $\Delta_{23}=Kmax\_2 \times k_2\%$, where $k_1$ and $k_2$ are numbers greater than 0, and $k_1$ is not equal to $k_2$.

Similarly, in the procedure shown in FIG. 6A to FIG. 6C, the upper ECN threshold in the ECN configuration information is also decreased for a plurality of times, and a manner of decreasing the upper ECN threshold each time may be similar to a manner of increasing the upper ECN threshold. For example, the upper ECN threshold is increased with a same amplitude or different amplitudes, or with a same proportion or different proportions.

In the procedure shown in FIG. 6A to FIG. 6C, a manner of adjusting the lower ECN threshold in the ECN configuration information is similar to a manner of adjusting the maximum ECN marking probability and a manner of adjusting the upper ECN threshold. For brevity, details are not described herein.

For ease of description, the network congestion processing method shown in FIG. 6A to FIG. 6C may also be referred to as a heuristic learning method.

Figure 7:
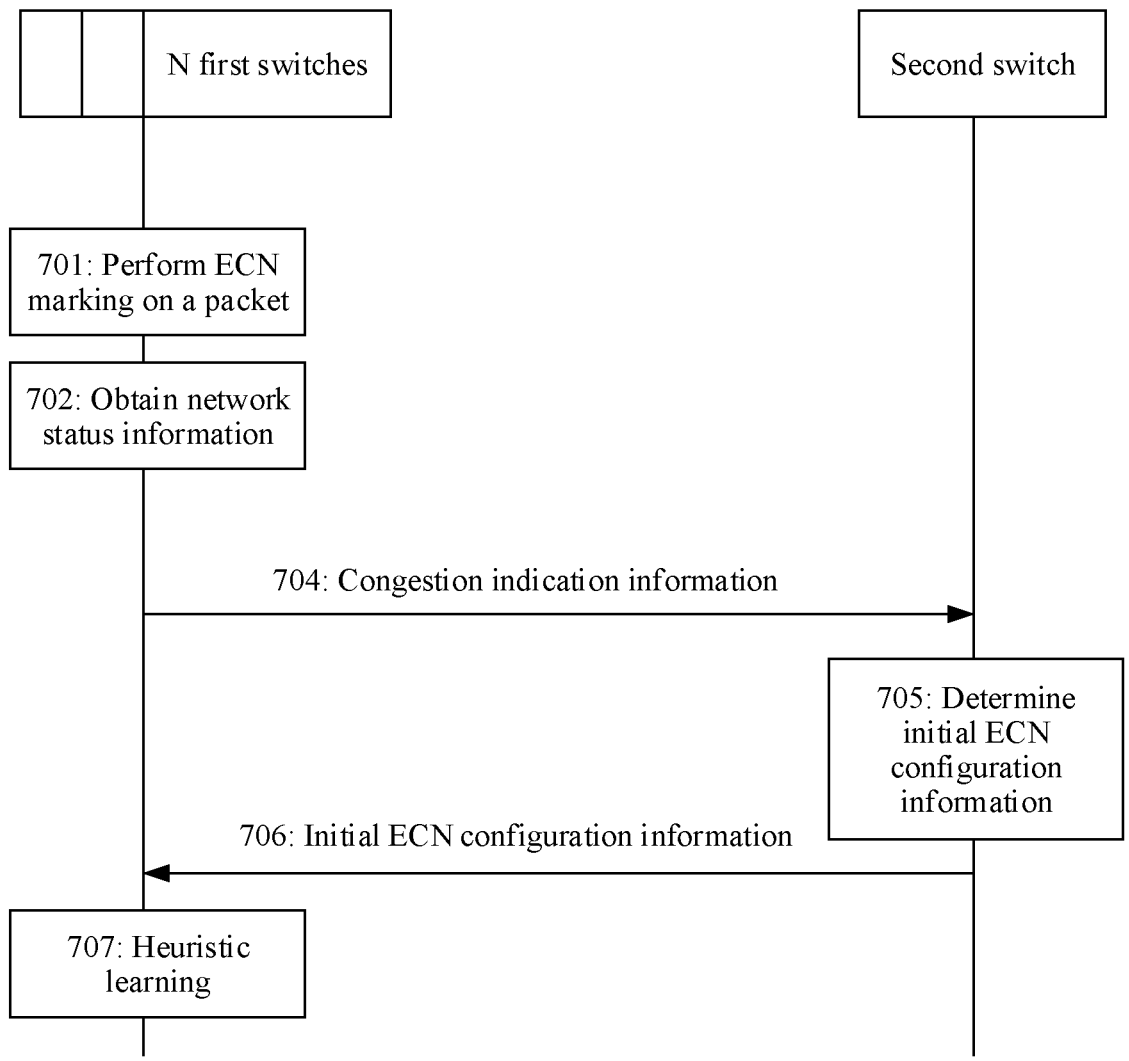
FIG. 7 shows another network congestion processing method according to an embodiment of this application.

FIG. 7 shows another network congestion processing method according to an embodiment of this application. The method shown in FIG. 7 may be applied to the data center network shown in FIG. 2 or FIG. 3. For ease of description, the method shown in FIG. 7 is described by using a switch as an example. It may be understood that the method shown in FIG. 7 may be performed by a switch or a component (for example, a chip or a circuit) in the switch. A first switch in the method shown in FIG. 7 is a switch connected to a server. For example, the first switch may be an access layer switch in the data center network shown in FIG. 2. For another example, the first switch may be a leaf layer switch in the data center network shown in FIG. 3. A second switch in the method shown in FIG. 7 is a switch located on an upper layer of the first switch. For example, the second switch may be an aggregation layer switch in the data center network shown in FIG. 2. For another example, the second switch may be a spine layer switch in the data center network shown in FIG. 3.

701: N first switches mark a packet based on preset ECN configuration information, where N is a positive integer greater than or equal to 2.

Optionally, in some embodiments, preset ECN configuration information of any two of the plurality of first switches may be the same.

Optionally, in some other embodiments, preset ECN configuration information of any two of the plurality of first switches may be different.

702: The N first switches each obtain network status information.

Each of the N switches performs ECN marking on the packet based on the preset ECN configuration information. Therefore, the network status information obtained by each switch in step 702 is collected when each switch performs ECN marking on the packet by using the preset ECN configuration information.

Assuming that a value of N is 2, the two first switches are respectively referred to as a first switch 1 and a first switch 2. Preset ECN configuration information of the first switch 1 may be referred to as ECN configuration information 0_1, and preset ECN configuration information of the first switch 2 may be referred to as ECN configuration information 0_2. As described above, the ECN configuration information 0_1 may be equal to the ECN configuration information 0_2, or the ECN configuration information 0_1 may not be equal to the ECN configuration information 0_2.

The first switch 1 may perform ECN marking on the packet based on the ECN configuration information 0_1. Therefore, the network status information determined by the first switch 1 in step 702 is collected when the first switch 1 performs ECN marking on the packet by using the ECN configuration information 0_1. For ease of description, the network status information may be referred to as network status information 0_1 below.

The first switch 2 may perform ECN marking on the packet based on the ECN configuration information 0_2. Therefore, the network status information determined by the first switch 2 in step 702 is collected when the first switch 2 performs ECN marking on the packet by using the ECN configuration information 0_2. For ease of description, the network status information may be referred to as network status information 0_2 below.

703: Each of the N first switches determines congestion indication information based on the obtained network status information, where the congestion indication information is used to indicate a congestion degree of each first switch.

The first switch 1 and the first switch 2 are further used as examples. The first switch 1 may determine congestion indication information 1 based on the network status information 0_1, where the congestion indication information 1 is used to indicate a congestion degree of the first switch 1. The first switch 2 may determine congestion indication information 2 based on the network status information 0_2, where the congestion indication information 2 is used to indicate a congestion degree of the first switch 2.

The first switch may obtain the congestion indication information of the first switch by quantizing the collected network status information.

Optionally, in some embodiments, the congestion indication information may be determined according to a formula 1.2:

$$CI = \alpha \times (N_{bit})/(N_{ECN}), \quad \text{Formula 1.2.}$$

Herein, CI represents the congestion indication information, $\alpha$ is a preset parameter, $N_{bit}$ represents a quantity of transmitted bytes (bits) within a period of time, and $N_{ECN}$ represents a quantity of ECN marked packets within a period of time.

Optionally, in some other embodiments, the congestion indication information may be determined according to a formula 1.3:

$$CI = \beta \times (N_{pkt})/(N_{ECN}), \quad \text{Formula 1.3.}$$

Herein, CI represents the congestion indication information, $\beta$ is a preset parameter, $N_{pkt}$ represents a quantity of transmitted packets within a period of time, and $N_{ECN}$ represents a quantity of ECN marked packets within a period of time.

Optionally, in some other embodiments, the congestion indication information may be determined according to a formula 1.4:

$$CI=\gamma/N_{ECN}, \quad \text{Formula 1.4.}$$

Herein, CI represents the congestion indication information, $\gamma$ is a preset parameter, and $N_{ECN}$ represents a quantity of ECN marked packets within a period of time.

Optionally, in some other embodiments, the congestion indication information may be determined according to a formula 1.5:

$$CI=\mu \times N_{bit} \quad \text{Formula 1.5.}$$

Herein, CI represents the congestion indication information, $\mu$ is a preset parameter, and $N_{bit}$ represents a quantity of transmitted bytes (bits) within a period of time.

Optionally, in some other embodiments, the congestion indication information may be determined according to a formula 1.6:

$$CI=\varepsilon \times N_{pkt} \quad \text{Formula 1.6.}$$

Herein, CI represents the congestion indication information, $\varepsilon$ is a preset parameter, and $N_{pkt}$ represents a quantity of transmitted packets within a period of time.

In other words, the congestion indication information is positively correlated with a quantity of transmitted bytes (bits) within a period of time and a quantity of transmitted packets within a period of time, and/or is negatively correlated with a quantity of ECN marked packets within a period of time.

Optionally, in some other embodiments, the congestion indication information may be negatively correlated with a quantity of transmitted bytes (bits) within a period of time and a quantity of transmitted packets within a period of time, and is positively correlated with a quantity of ECN marked packets within a period of time.

Whether the congestion indication information is positively or negatively correlated with the quantity of transmitted bytes (bits) within a period of time, the quantity of transmitted packets within a period of time, and the quantity of ECN marked packets within a period of time is related to a method for processing, by the second switch, the congestion indication information sent by the first switch.

704: Each of the N first switches sends the determined congestion indication information to the second switch. Correspondingly, the second switch separately receives the N pieces of congestion indication information from the N first switches.

The first switch 1 and the first switch 2 are further used as examples. The second switch may receive the congestion indication information 1 from the first switch 1 and the congestion indication information 2 from the first switch 2.

705: The second switch may determine initial ECN configuration information based on the N pieces of congestion indication information.

706: The second switch sends the determined initial ECN configuration information to the N first switches. Correspondingly, the N first switches receive the initial ECN configuration information from the second switch.

Optionally, in some embodiments, the second switch may determine one piece of corresponding initial ECN configuration information for each of the N first switches based on the N pieces of congestion indication information, and send the determined initial ECN configuration information to the corresponding first switch.

The first switch 1 and the first switch 2 are further used as examples. The second switch may determine initial ECN configuration information 1 based on the congestion indication information 1 and the congestion indication information 2, and send the initial ECN configuration information 1 to the first switch 1. The second switch may determine initial ECN configuration information 2 based on the congestion indication information 1 and the congestion indication information 2, and send the initial ECN configuration information 2 to the first switch 2.

After receiving the congestion indication information from the first switch, the second switch sorts the received congestion indication information. The congestion indication information may be sorted in descending order, or may be sorted in ascending order.

The second switch may preset one piece of typical ECN configuration information. The typical ECN configuration information may be an empirical value and may be adjusted.

Different pieces of initial ECN configuration information may be calculated for different first switches in the following manners in an order of congestion indication information of the first switches and the typical ECN configuration information.

Manner 1: The typical ECN configuration is assigned to a first switch with a lowest congestion degree, and the other switches sequentially adjust the ECN configuration information.

For example, after receiving the congestion indication information, the second switch sorts the received congestion indication information in ascending order. A congestion degree indicated by the congestion indication information is directly proportional to a size of the congestion indication information. In other words, a congestion degree of a first switch corresponding to congestion indication information ranked first is the lowest, and a congestion degree of a switch corresponding to congestion indication information ranked last is the highest.

In this case, the typical ECN configuration information may be assigned to the first switch corresponding to the congestion indication information ranked first. The ECN configuration information of the other first switches may be sequentially increased based on the typical ECN configuration information.

For example, it is assumed that the second switch receives congestion indication information sent by five first switches in total. The five first switches are respectively a first switch 1, a first switch 2, a first switch 3, a first switch 4, and a first switch 5, and congestion degrees of the five first switches are sorted in ascending order: the first switch 1, the first switch 2, the first switch 3, the first switch 4, and the first switch 5. In other words, the congestion degree of the first switch 1 is the lowest, and the congestion degree of the first switch 5 is the highest.

In this case, the typical ECN configuration information is assigned to the first switch 1, and the ECN configuration information of the first switch 2 is increased based on the typical ECN configuration information. The ECN configuration information of the first switch 3 is increased based on the ECN configuration information of the first switch 2. The ECN configuration information of the first switch 4 is increased based on the ECN configuration information of the first switch 3. The ECN configuration information of the first switch 5 is increased based on the ECN configuration information of the first switch 4.

Increasing the ECN configuration information is increasing an upper ECN threshold, increasing a lower ECN threshold, and decreasing a maximum ECN marking probability.

The upper ECN threshold may be adjusted in the following manners.
1. The upper ECN threshold is increased according to a preset value with a same amplitude.
2. The upper ECN threshold is increased according to a preset value with different amplitudes.
3. The upper ECN threshold is increased according to a preset proportion with a same proportion.
4. The upper ECN threshold is increased according to a preset proportion with different proportions.

Kmin and Pmax are adjusted in a same manner, and the decrease is the same.

Manner 2: The typical ECN configuration is assigned to a first switch with a highest congestion degree, and the other switches sequentially adjust the ECN configuration information.

For example, after receiving the congestion indication information, the second switch sorts the received congestion indication information in descending order. A congestion degree indicated by the congestion indication information is directly proportional to a size of the congestion indication information. In other words, a congestion degree of a first switch corresponding to congestion indication information ranked first is the highest, and a congestion degree of a switch corresponding to congestion indication information ranked last is the lowest.

In this case, the typical ECN configuration information may be assigned to the first switch corresponding to the congestion indication information ranked first. The ECN configuration information of the other first switches may be sequentially decreased based on the typical ECN configuration information.

For example, it is assumed that the second switch receives congestion indication information sent by five first switches in total. The five first switches are respectively a first switch 1, a first switch 2, a first switch 3, a first switch 4, and a first switch 5, and congestion degrees of the five first switches are sorted in descending order: the first switch 1, the first switch 2, the first switch 3, the first switch 4, and the first switch 5. In other words, the congestion degree of the first switch 1 is the highest, and the congestion degree of the first switch 5 is the lowest.

In this case, the typical ECN configuration information is assigned to the first switch 1, and the ECN configuration information of the first switch 2 is decreased based on the typical ECN configuration information. The ECN configuration information of the first switch 3 is decreased based on the ECN configuration information of the first switch 2. The ECN configuration information of the first switch 4 is decreased based on the ECN configuration information of the first switch 3. The ECN configuration information of the first switch 5 is decreased based on the ECN configuration information of the first switch 4.

Decreasing the ECN configuration information is decreasing an upper ECN threshold, decreasing a lower ECN threshold, and increasing a maximum ECN marking probability.

Manner 3: The typical ECN configuration information is assigned to a first switch in any order, and the other switches in this order change corresponding ECN configuration information.

That the other first switches in this order change corresponding ECN configuration information means that, if congestion degrees of the plurality of first switches are lower than that of the first switch to which the typical ECN configuration information is assigned, the ECN configuration information is sequentially decreased, or if congestion degrees of the plurality of first switches are higher than that of the first switch to which the typical ECN configuration information is assigned, the ECN configuration information is sequentially increased.

For example, it is assumed that the second switch receives congestion indication information sent by five first switches in total. The five first switches are respectively a first switch 1, a first switch 2, a first switch 3, a first switch 4, and a first switch 5, and congestion degrees of the five first switches are sorted in ascending order: the first switch 1, the first switch 2, the first switch 3, the first switch 4, and the first switch 5. In other words, the congestion degree of the first switch 1 is the lowest, and the congestion degree of the first switch 5 is the highest.

It is assumed that the typical ECN configuration information is assigned to the first switch 3, and the ECN configuration information of the first switch 2 is decreased based on the typical ECN configuration information. The ECN configuration information of the first switch 1 is decreased based on the ECN configuration information of the first switch 2. The ECN configuration information of the first switch 4 is increased based on the typical ECN configuration information. The ECN configuration information of the first switch 5 is increased based on the ECN configuration information of the first switch 4.

Optionally, in some other embodiments, the second switch may determine one piece of initial ECN configuration information based on the N pieces of congestion indication information, and send the determined initial ECN configuration information to the N first switches. In other words, the second switch may determine the same initial ECN configuration information for the N first switches, and send the determined initial ECN configuration information to the N first switches.

707: Each of the N first switches performs heuristic learning based on the received initial ECN configuration information, to determine the ECN configuration information used by each first switch.

In other words, after receiving the initial ECN configuration information from the second switch, each of the N first switches may determine, according to the method shown in FIG. 6A to FIG. 6C, the ECN configuration information that needs to be used. A difference from the method shown in FIG. 6A to FIG. 6C lies in that step 601 in the method shown in FIG. 6A to FIG. 6C is performed for the first time, that is, the ECN configuration information in step 601 is not the ECN configuration information 9 obtained in the previous adjustment process. In this case, the ECN configuration information 1 is a preset value. However, if each of the N first switches determines the ECN configuration information according to the method shown in FIG. 6A to FIG. 6C, step 601 is performed for the first time, that is, the ECN configuration information in step 601 is not the ECN configuration information 9 obtained in the previous adjustment process. In this case, the ECN configuration information 1 is the initial ECN configuration information sent by the second switch.

A specific procedure in which each of the N switches determines, based on the initial ECN configuration information, the ECN configuration information that needs to be used is the same as the procedure shown in FIG. 6A to FIG. 6C. For brevity, details are not described herein again.

According to the method shown in FIG. 7, the second switch may determine the initial ECN configuration information for the first switch based on a congestion status of each first switch in the data center network. In other words, the second switch may allocate the initial ECN configuration information based on global information. In this way, the first ECN configuration information (that is, the ECN configuration information 1) used by each first switch during heuristic learning can more conform to an overall network status of the data center, thereby accelerating convergence of the ECN configuration information.

Figure 8:
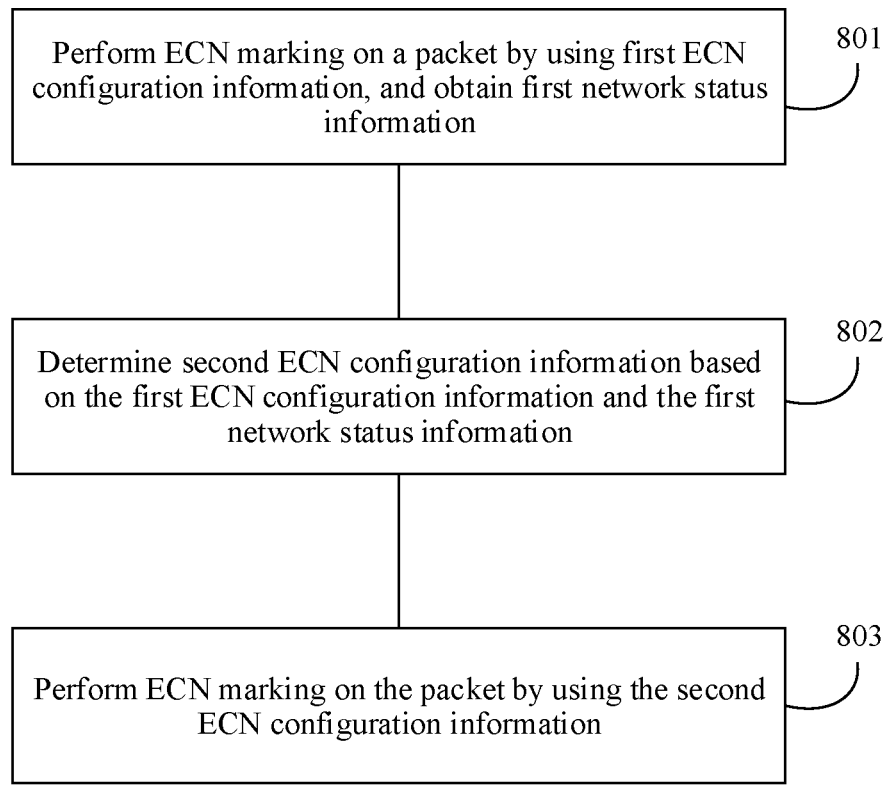
FIG. 8 shows another network congestion processing method according to an embodiment of this application.

FIG. 8 shows another network congestion processing method according to an embodiment of this application. The method shown in FIG. 8 may be applied to any data center network in FIG. 2 to FIG. 4. The method shown in FIG. 8 may be performed by a switch, or may be performed by a component (for example, a chip or a circuit) in the switch. For ease of description, the following describes the method shown in FIG. 8 by using a switch as an example. The switch may be a switch connected to a server in the network shown in FIG. 2 to FIG. 4, for example, an access layer switch in the data center network shown in FIG. 2, or a leaf layer switch in the data center network shown in FIG. 3.

801: A first switch performs ECN marking on a packet by using first ECN configuration information, and obtains first network status information, where the first network status information is used to indicate a network status of the first switch when the first ECN configuration information is used.

802: The first switch determines second ECN configuration information based on the first ECN configuration information and the first network status information.

803: The first switch performs ECN marking on the packet by using the second ECN configuration information.

Optionally, determining second ECN configuration information based on the first ECN configuration information and the first network status information includes determining whether a quantity of ECN marked packets in the first network status information is less than a preset threshold, and if the quantity of ECN marked packets in the first network status information is greater than or equal to the preset threshold, determining that an upper ECN threshold in the second ECN configuration information is greater than an upper ECN threshold in the first ECN configuration information, determining that a lower ECN threshold in the second ECN configuration information is equal to a lower ECN threshold in the first ECN configuration information, and determining that a maximum ECN marking probability in the second ECN configuration information is equal to a maximum ECN marking probability in the first ECN configuration information, or if the quantity of ECN marked packets in the first network status information is less than the preset threshold, determining that the second ECN configuration information is the same as the first ECN configuration information.

Optionally, determining second ECN configuration information based on the first ECN configuration information and the first network status information includes determining a change trend of a congestion degree based on the first network status information, and determining the second ECN configuration information based on a determining result, the first ECN configuration information, and third ECN configuration information, where the first ECN configuration information is determined based on the third ECN configuration information.

Optionally, determining the second ECN configuration information based on a determining result, the first ECN configuration information, and third ECN configuration information includes determining the second ECN configuration information when an upper ECN threshold in the first ECN configuration information is greater than an upper ECN threshold in the third ECN configuration information, a lower ECN threshold in the first ECN configuration information is equal to a lower ECN threshold in the third ECN configuration information, a maximum ECN marking probability in the first ECN configuration information is equal to a maximum ECN marking probability in the third ECN configuration information, and the congestion degree decreases, where an upper ECN threshold in the second ECN configuration information is greater than the upper ECN threshold in the first ECN configuration information, a lower ECN threshold in the second ECN configuration information is greater than the lower ECN threshold in the first ECN configuration information, and a maximum ECN marking probability in the second ECN configuration information is equal to the maximum ECN marking probability in the first ECN configuration information, or determining the second ECN configuration information when an upper ECN threshold in the first ECN configuration information is greater than an upper ECN threshold in the third ECN configuration information, a lower ECN threshold in the first ECN configuration information is equal to a lower ECN threshold in the third ECN configuration information, a maximum ECN marking probability in the first ECN configuration information is equal to a maximum ECN marking probability in the third ECN configuration information, and the congestion degree does not decrease, where an upper ECN threshold in the second ECN configuration information is equal to the upper ECN threshold in the first ECN configuration information, a lower ECN threshold in the second ECN configuration information is greater than the lower ECN threshold in the first ECN configuration information, and a maximum ECN marking probability in the second ECN configuration information is equal to the maximum ECN marking probability in the first ECN configuration information.

Optionally, before performing ECN marking on a packet by using first ECN configuration information, the method further includes obtaining reference network status information, determining congestion indication information based on the reference network status information, where the congestion indication information is used to indicate the congestion degree, sending the congestion indication information to a second switch, and receiving the third ECN configuration information from the second switch.

Optionally, determining the second ECN configuration information based on a determining result, the first ECN configuration information, and third ECN configuration information includes determining the second ECN configuration information when an upper ECN threshold in the first ECN configuration information is greater than an upper ECN threshold in the third ECN configuration information, a lower ECN threshold in the first ECN configuration information is greater than a lower ECN threshold in the third ECN configuration information, a maximum ECN marking probability in the first ECN configuration information is equal to a maximum ECN marking probability in the third ECN configuration information, and the congestion degree decreases, where an upper ECN threshold in the second ECN configuration information is greater than the upper ECN threshold in the first ECN configuration information, a lower ECN threshold in the second ECN configuration information is greater than the lower ECN threshold in the first ECN configuration information, and a maximum ECN marking probability in the second ECN configuration information is equal to the maximum ECN marking probability in the first ECN configuration information, or determining the second ECN configuration information when an upper ECN threshold in the first ECN configuration information is greater than an upper ECN threshold in the third ECN configuration information, a lower ECN threshold in the first ECN configuration information is greater than a lower ECN threshold in the third ECN configuration information, a maximum ECN marking probability in the first ECN configuration information is equal to a maximum ECN marking probability in the third ECN configuration information, and the congestion degree does not decrease, where an upper ECN threshold in the second ECN configuration information is greater than the upper ECN threshold in the first ECN configuration information, a lower ECN threshold in the second ECN configuration information is equal to the lower ECN threshold in the first ECN configuration information, and a maximum ECN marking probability in the second ECN configuration information is equal to the maximum ECN marking probability in the first ECN configuration information.

Optionally, determining the second ECN configuration information based on a determining result, the first ECN configuration information, and third ECN configuration information includes determining the second ECN configuration information when an upper ECN threshold in the first ECN configuration information is equal to an upper ECN threshold in the third ECN configuration information, a lower ECN threshold in the first ECN configuration information is greater than a lower ECN threshold in the third ECN configuration information, a maximum ECN marking probability in the first ECN configuration information is equal to a maximum ECN marking probability in the third ECN configuration information, and the congestion degree decreases, where an upper ECN threshold in the second ECN configuration information is equal to the upper ECN threshold in the first ECN configuration information, a lower ECN threshold in the second ECN configuration information is greater than the lower ECN threshold in the first ECN configuration information, and a maximum ECN marking probability in the second ECN configuration information is less than the maximum ECN marking probability in the first ECN configuration information, or determining the second ECN configuration information when an upper ECN threshold in the first ECN configuration information is equal to an upper ECN threshold in the third ECN configuration information, a lower ECN threshold in the first ECN configuration information is greater than a lower ECN threshold in the third ECN configuration information, a maximum ECN marking probability in the first ECN configuration information is equal to a maximum ECN marking probability in the third ECN configuration information, and the congestion degree does not decrease, where an upper ECN threshold in the second ECN configuration information is equal to the upper ECN threshold in the first ECN configuration information, a lower ECN threshold in the second ECN configuration information is equal to the lower ECN threshold in the first ECN configuration information, and a maximum ECN marking probability in the second ECN configuration information is less than the maximum ECN marking probability in the first ECN configuration information.

Optionally, determining the second ECN configuration information based on a determining result, the first ECN configuration information, and third ECN configuration information includes determining the second ECN configuration information when an upper ECN threshold in the first ECN configuration information is equal to an upper ECN threshold in the third ECN configuration information, a lower ECN threshold in the first ECN configuration information is greater than a lower ECN threshold in the third ECN configuration information, a maximum ECN marking probability in the first ECN configuration information is less than a maximum ECN marking probability in the third ECN configuration information, and the congestion degree decreases, where an upper ECN threshold in the second ECN configuration information is equal to the upper ECN threshold in the first ECN configuration information, a lower ECN threshold in the second ECN configuration information is greater than the lower ECN threshold in the first ECN configuration information, and a maximum ECN marking probability in the second ECN configuration information is less than the maximum ECN marking probability in the first ECN configuration information, or determining the second ECN configuration information when an upper ECN threshold in the first ECN configuration information is equal to an upper ECN threshold in the third ECN configuration information, a lower ECN threshold in the first ECN configuration information is greater than a lower ECN threshold in the third ECN configuration information, a maximum ECN marking probability in the first ECN configuration information is less than a maximum ECN marking probability in the third ECN configuration information, and the congestion degree does not decrease, where an upper ECN threshold in the second ECN configuration information is equal to the upper ECN threshold in the first ECN configuration information, a lower ECN threshold in the second ECN configuration information is greater than the lower ECN threshold in the first ECN configuration information, and a maximum ECN marking probability in the second ECN configuration information is equal to the maximum ECN marking probability in the first ECN configuration information.

Optionally, determining the second ECN configuration information based on a determining result, the first ECN configuration information, and third ECN configuration information includes determining the second ECN configuration information when an upper ECN threshold in the first ECN configuration information is equal to an upper ECN threshold in the third ECN configuration information, a lower ECN threshold in the first ECN configuration information is equal to a lower ECN threshold in the third ECN configuration information, a maximum ECN marking probability in the first ECN configuration information is less than a maximum ECN marking probability in the third ECN configuration information, and the congestion degree decreases, where an upper ECN threshold in the second ECN configuration information is equal to the upper ECN threshold in the first ECN configuration information, a lower ECN threshold in the second ECN configuration information is equal to the lower ECN threshold in the first ECN configuration information, and a maximum ECN marking probability in the second ECN configuration information is less than the maximum ECN marking probability in the first ECN configuration information, or determining the second ECN configuration information when an upper ECN threshold in the first ECN configuration information is equal to an upper ECN threshold in the third ECN configuration information, a lower ECN threshold in the first ECN configuration information is equal to a lower ECN threshold in the third ECN configuration information, a maximum ECN marking probability in the first ECN configuration information is less than a maximum ECN marking probability in the third ECN configuration information, and the congestion degree does not decrease, where an upper ECN threshold in the second ECN configuration information is less than the upper ECN threshold in the first ECN configuration information, a lower ECN threshold in the second ECN configuration information is equal to the lower ECN threshold in the first ECN configuration information, and a maximum ECN marking probability in the second ECN configuration information is equal to the maximum ECN marking probability in the first ECN configuration information.

Optionally, determining the second ECN configuration information based on a determining result, the first ECN configuration information, and third ECN configuration information includes determining the second ECN configuration information when an upper ECN threshold in the first ECN configuration information is less than an upper ECN threshold in the third ECN configuration information, a lower ECN threshold in the first ECN configuration information is equal to a lower ECN threshold in the third ECN configuration information, a maximum ECN marking probability in the first ECN configuration information is equal to a maximum ECN marking probability in the third ECN configuration information, and the congestion degree increases, where an upper ECN threshold in the second ECN configuration information is equal to the upper ECN threshold in the first ECN configuration information, a lower ECN threshold in the second ECN configuration information is less than the lower ECN threshold in the first ECN configuration information, and a maximum ECN marking probability in the second ECN configuration information is equal to the maximum ECN marking probability in the first ECN configuration information, or determining the second ECN configuration information when an upper ECN threshold in the first ECN configuration information is less than an upper ECN threshold in the third ECN configuration information, a lower ECN threshold in the first ECN configuration information is equal to a lower ECN threshold in the third ECN configuration information, a maximum ECN marking probability in the first ECN configuration information is equal to a maximum ECN marking probability in the third ECN configuration information, and the congestion degree does not increase, where an upper ECN threshold in the second ECN configuration information is less than the upper ECN threshold in the first ECN configuration information, a lower ECN threshold in the second ECN configuration information is equal to the lower ECN threshold in the first ECN configuration information, and a maximum ECN marking probability in the second ECN configuration information is equal to the maximum ECN marking probability in the first ECN configuration information.

Optionally, determining the second ECN configuration information based on a determining result, the first ECN configuration information, and third ECN configuration information includes determining the second ECN configuration information when an upper ECN threshold in the first ECN configuration information is equal to an upper ECN threshold in the third ECN configuration information, a lower ECN threshold in the first ECN configuration information is less than a lower ECN threshold in the third ECN configuration information, a maximum ECN marking probability in the first ECN configuration information is equal to a maximum ECN marking probability in the third ECN configuration information, and the congestion degree increases, where an upper ECN threshold in the second ECN configuration information is equal to the upper ECN threshold in the first ECN configuration information, a lower ECN threshold in the second ECN configuration information is equal to the lower ECN threshold in the first ECN configuration information, and a maximum ECN marking probability in the second ECN configuration information is greater than the maximum ECN marking probability in the first ECN configuration information, or determining the second ECN configuration information when an upper ECN threshold in the first ECN configuration information is equal to an upper ECN threshold in the third ECN configuration information, a lower ECN threshold in the first ECN configuration information is less than a lower ECN threshold in the third ECN configuration information, a maximum ECN marking probability in the first ECN configuration information is equal to a maximum ECN marking probability in the third ECN configuration information, and the congestion degree does not increase, where an upper ECN threshold in the second ECN configuration information is equal to the upper ECN threshold in the first ECN configuration information, a lower ECN threshold in the second ECN configuration information is less than the lower ECN threshold in the first ECN configuration information, and a maximum ECN marking probability in the second ECN configuration information is equal to the maximum ECN marking probability in the first ECN configuration information.

Optionally, determining the second ECN configuration information based on a determining result, the first ECN configuration information, and third ECN configuration information includes determining the second ECN configuration information when an upper ECN threshold in the first ECN configuration information is equal to an upper ECN threshold in the third ECN configuration information, a lower ECN threshold in the first ECN configuration information is equal to a lower ECN threshold in the third ECN configuration information, a maximum ECN marking probability in the first ECN configuration information is greater than a maximum ECN marking probability in the third ECN configuration information, and the congestion degree increases, where an upper ECN threshold in the second ECN configuration information is equal to the upper ECN threshold in the first ECN configuration information, a lower ECN threshold in the second ECN configuration information is equal to the lower ECN threshold in the first ECN configuration information, and a maximum ECN marking probability in the second ECN configuration information is equal to the maximum ECN marking probability in the first ECN configuration information, or determining the second ECN configuration information when an upper ECN threshold in the first ECN configuration information is equal to an upper ECN threshold in the third ECN configuration information, a lower ECN threshold in the first ECN configuration information is equal to a lower ECN threshold in the third ECN configuration information, a maximum ECN marking probability in the first ECN configuration information is greater than a maximum ECN marking probability in the third ECN configuration information, and the congestion degree does not increase, where an upper ECN threshold in the second ECN configuration information is equal to the upper ECN threshold in the first ECN configuration information, a lower ECN threshold in the second ECN configuration information is equal to the lower ECN threshold in the first ECN configuration information, and a maximum ECN marking probability in the second ECN configuration information is greater than the maximum ECN marking probability in the first ECN configuration information.

Optionally, when the upper ECN threshold in the second ECN configuration information is equal to the upper ECN threshold in the first ECN configuration information, the lower ECN threshold in the second ECN configuration information is equal to the lower ECN threshold in the first ECN configuration information, and the maximum ECN marking probability in the second ECN configuration information is equal to the maximum ECN marking probability in the first ECN configuration information, the method further includes obtaining second network status information, where the second network status information is used to indicate a network status when the second ECN configuration information is used, determining whether a quantity of ECN marked packets in the second network status information is less than a preset threshold, and if the quantity of ECN marked packets in the second network status information is greater than or equal to the preset threshold, determining fourth ECN configuration information based on the second ECN configuration information, where an upper ECN threshold in the fourth ECN configuration information is greater than the upper ECN threshold in the second ECN configuration information, a lower ECN threshold in the fourth ECN configuration information is equal to the lower ECN threshold in the second ECN configuration information, and a maximum ECN marking probability in the fourth ECN configuration information is equal to the maximum ECN marking probability in the second ECN configuration information, or if the quantity of ECN marked packets in the second network status information is less than the preset threshold, continuing to perform ECN marking on the packet by using the second ECN configuration information.

FIG. 5 to FIG. 8 describe the technical solutions of this application by using a switch that supports an ECN technology as an example. It may be understood that the technical solutions in the embodiments of this application may be applied to another type of network device that can perform flow control by using the ECN technology, for example, a server.

Figure 9:
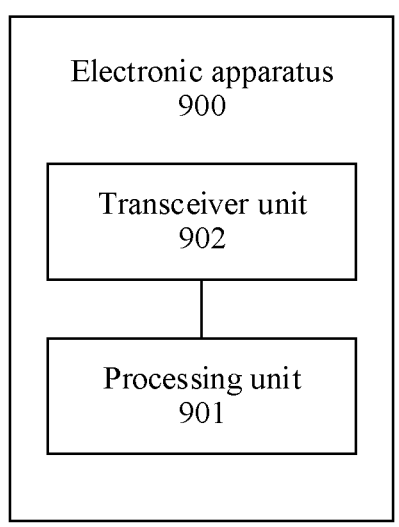
FIG. 9 is a schematic block diagram of a structure of an electronic apparatus according to an embodiment of this application.

FIG. 9 is a schematic block diagram of a structure of an electronic apparatus according to an embodiment of this application. As shown in FIG. 9, the electronic apparatus 900 includes a processing unit 901 and a transceiver unit 902. The electronic apparatus 900 may perform the method shown in FIG. 6A to FIG. 6C or FIG. 8 and the steps performed by the first switch in the method shown in FIG. 7. The electronic apparatus 900 may be a network device (for example, a switch), or may be a chip.

The processing unit 901 is configured to perform ECN marking on a packet by using first ECN configuration information. The processing unit 901 is further configured to obtain first network status information, where the first network status information is used to indicate a network status when the first ECN configuration information is used. The processing unit 901 is further configured to determine second ECN configuration information based on the first ECN configuration information and the first network status information. The processing unit 901 is further configured to perform ECN marking on the packet by using the second ECN configuration information. The transceiver unit 902 is configured to send the packet.

Optionally, the processing unit 901 is further configured to determine whether a quantity of ECN marked packets in the first network status information is less than a preset threshold, and if the quantity of ECN marked packets in the first network status information is greater than or equal to the preset threshold, determine that an upper ECN threshold in the second ECN configuration information is greater than an upper ECN threshold in the first ECN configuration information, determine that a lower ECN threshold in the second ECN configuration information is equal to a lower ECN threshold in the first ECN configuration information, and determine that a maximum ECN marking probability in the second ECN configuration information is equal to a maximum ECN marking probability in the first ECN configuration information, or if the quantity of ECN marked packets in the first network status information is less than the preset threshold, determine that the second ECN configuration information is the same as the first ECN configuration information.

Optionally, the processing unit 901 is further configured to determine a change trend of a congestion degree based on the first network status information, and determine the second ECN configuration information based on a determining result, the first ECN configuration information, and third ECN configuration information, where the first ECN configuration information is determined based on the third ECN configuration information.

Optionally, the processing unit 901 is further configured to determine the second ECN configuration information when an upper ECN threshold in the first ECN configuration information is greater than an upper ECN threshold in the third ECN configuration information, a lower ECN threshold in the first ECN configuration information is equal to a lower ECN threshold in the third ECN configuration information, a maximum ECN marking probability in the first ECN configuration information is equal to a maximum ECN marking probability in the third ECN configuration information, and the congestion degree decreases, where an upper ECN threshold in the second ECN configuration information is greater than the upper ECN threshold in the first ECN configuration information, a lower ECN threshold in the second ECN configuration information is greater than the lower ECN threshold in the first ECN configuration information, and a maximum ECN marking probability in the second ECN configuration information is equal to the maximum ECN marking probability in the first ECN configuration information, or determine the second ECN configuration information when an upper ECN threshold in the first ECN configuration information is greater than an upper ECN threshold in the third ECN configuration information, a lower ECN threshold in the first ECN configuration information is equal to a lower ECN threshold in the third ECN configuration information, a maximum ECN marking probability in the first ECN configuration information is equal to a maximum ECN marking probability in the third ECN configuration information, and the congestion degree does not decrease, where an upper ECN threshold in the second ECN configuration information is equal to the upper ECN threshold in the first ECN configuration information, a lower ECN threshold in the second ECN configuration information is greater than the lower ECN threshold in the first ECN configuration information, and a maximum ECN marking probability in the second ECN configuration information is equal to the maximum ECN marking probability in the first ECN configuration information.

Optionally, the processing unit 901 is further configured to obtain reference network status information. The processing unit 901 is further configured to determine congestion indication information based on the reference network status information, where the congestion indication information is used to indicate the congestion degree. The transceiver unit 902 is further configured to send the congestion indication information to a network device. The transceiver unit 902 is further configured to receive the third ECN configuration information from the network device.

Optionally, the processing unit 901 is further configured to determine the second ECN configuration information when an upper ECN threshold in the first ECN configuration information is greater than an upper ECN threshold in the third ECN configuration information, a lower ECN threshold in the first ECN configuration information is greater than a lower ECN threshold in the third ECN configuration information, a maximum ECN marking probability in the first ECN configuration information is equal to a maximum ECN marking probability in the third ECN configuration information, and the congestion degree decreases, where an upper ECN threshold in the second ECN configuration information is greater than the upper ECN threshold in the first ECN configuration information, a lower ECN threshold in the second ECN configuration information is greater than the lower ECN threshold in the first ECN configuration information, and a maximum ECN marking probability in the second ECN configuration information is equal to the maximum ECN marking probability in the first ECN configuration information, or determine the second ECN configuration information when an upper ECN threshold in the first ECN configuration information is greater than an upper ECN threshold in the third ECN configuration information, a lower ECN threshold in the first ECN configuration information is greater than a lower ECN threshold in the third ECN configuration information, a maximum ECN marking probability in the first ECN configuration information is equal to a maximum ECN marking probability in the third ECN configuration information, and the congestion degree does not decrease, where an upper ECN threshold in the second ECN configuration information is greater than the upper ECN threshold in the first ECN configuration information, a lower ECN threshold in the second ECN configuration information is equal to the lower ECN threshold in the first ECN configuration information, and a maximum ECN marking probability in the second ECN configuration information is equal to the maximum ECN marking probability in the first ECN configuration information.

Optionally, the processing unit 901 is further configured to determine the second ECN configuration information when an upper ECN threshold in the first ECN configuration information is equal to an upper ECN threshold in the third ECN configuration information, a lower ECN threshold in the first ECN configuration information is greater than a lower ECN threshold in the third ECN configuration information, a maximum ECN marking probability in the first ECN configuration information is equal to a maximum ECN marking probability in the third ECN configuration information, and the congestion degree decreases, where an upper ECN threshold in the second ECN configuration information is equal to the upper ECN threshold in the first ECN configuration information, a lower ECN threshold in the second ECN configuration information is greater than the lower ECN threshold in the first ECN configuration information, and a maximum ECN marking probability in the second ECN configuration information is less than the maximum ECN marking probability in the first ECN configuration information, or determine the second ECN configuration information when an upper ECN threshold in the first ECN configuration information is equal to an upper ECN threshold in the third ECN configuration information, a lower ECN threshold in the first ECN configuration information is greater than a lower ECN threshold in the third ECN configuration information, a maximum ECN marking probability in the first ECN configuration information is equal to a maximum ECN marking probability in the third ECN configuration information, and the congestion degree does not decrease, where an upper ECN threshold in the second ECN configuration information is equal to the upper ECN threshold in the first ECN configuration information, a lower ECN threshold in the second ECN configuration information is greater than the lower ECN threshold in the first ECN configuration information, and a maximum ECN marking probability in the second ECN configuration information is equal to the maximum ECN marking probability in the first ECN configuration information.

Optionally, the processing unit 901 is further configured to determine the second ECN configuration information when an upper ECN threshold in the first ECN configuration information is equal to an upper ECN threshold in the third ECN configuration information, a lower ECN threshold in the first ECN configuration information is equal to a lower ECN threshold in the third ECN configuration information, a maximum ECN marking probability in the first ECN configuration information is less than a maximum ECN marking probability in the third ECN configuration information, and the congestion degree decreases, where an upper ECN threshold in the second ECN configuration information is equal to the upper ECN threshold in the first ECN configuration information, a lower ECN threshold in the second ECN configuration information is equal to the lower ECN threshold in the first ECN configuration information, and a maximum ECN marking probability in the second ECN configuration information is less than the maximum ECN marking probability in the first ECN configuration information, or determine the second ECN configuration information when an upper ECN threshold in the first ECN configuration information is equal to an upper ECN threshold in the third ECN configuration information, a lower ECN threshold in the first ECN configuration information is equal to a lower ECN threshold in the third ECN configuration information, a maximum ECN marking probability in the first ECN configuration information is less than a maximum ECN marking probability in the third ECN configuration information, and the congestion degree does not decrease, where an upper ECN threshold in the second ECN configuration information is less than the upper ECN threshold in the first ECN configuration information, a lower ECN threshold in the second ECN configuration information is equal to the lower ECN threshold in the first ECN configuration information, and a maximum ECN marking probability in the second ECN configuration information is equal to the maximum ECN marking probability in the first ECN configuration information.

Optionally, the processing unit 901 is further configured to determine the second ECN configuration information when an upper ECN threshold in the first ECN configuration information is less than an upper ECN threshold in the third ECN configuration information, a lower ECN threshold in the first ECN configuration information is equal to a lower ECN threshold in the third ECN configuration information, a maximum ECN marking probability in the first ECN configuration information is equal to a maximum ECN marking probability in the third ECN configuration information, and the congestion degree increases, where an upper ECN threshold in the second ECN configuration information is equal to the upper ECN threshold in the first ECN configuration information, a lower ECN threshold in the second ECN configuration information is less than the lower ECN threshold in the first ECN configuration information, and a maximum ECN marking probability in the second ECN configuration information is equal to the maximum ECN marking probability in the first ECN configuration information, or determine the second ECN configuration information when an upper ECN threshold in the first ECN configuration information is less than an upper ECN threshold in the third ECN configuration information, a lower ECN threshold in the first ECN configuration information is equal to a lower ECN threshold in the third ECN configuration information, a maximum ECN marking probability in the first ECN configuration information is equal to a maximum ECN marking probability in the third ECN configuration information, and the congestion degree does not increase, where an upper ECN threshold in the second ECN configuration information is less than the upper ECN threshold in the first ECN configuration information, a lower ECN threshold in the second ECN configuration information is equal to the lower ECN threshold in the first ECN configuration information, and a maximum ECN marking probability in the second ECN configuration information is equal to the maximum ECN marking probability in the first ECN configuration information.

Optionally, the processing unit 901 is further configured to determine the second ECN configuration information when an upper ECN threshold in the first ECN configuration information is equal to an upper ECN threshold in the third ECN configuration information, a lower ECN threshold in the first ECN configuration information is less than a lower ECN threshold in the third ECN configuration information, a maximum ECN marking probability in the first ECN configuration information is equal to a maximum ECN marking probability in the third ECN configuration information, and the congestion degree increases, where an upper ECN threshold in the second ECN configuration information is equal to the upper ECN threshold in the first ECN configuration information, a lower ECN threshold in the second ECN configuration information is equal to the lower ECN threshold in the first ECN configuration information, and a maximum ECN marking probability in the second ECN configuration information is greater than the maximum ECN marking probability in the first ECN configuration information, or determine the second ECN configuration information when an upper ECN threshold in the first ECN configuration information is equal to an upper ECN threshold in the third ECN configuration information, a lower ECN threshold in the first ECN configuration information is less than a lower ECN threshold in the third ECN configuration information, a maximum ECN marking probability in the first ECN configuration information is equal to a maximum ECN marking probability in the third ECN configuration information, and the congestion degree does not increase, where an upper ECN threshold in the second ECN configuration information is equal to the upper ECN threshold in the first ECN configuration information, a lower ECN threshold in the second ECN configuration information is less than the lower ECN threshold in the first ECN configuration information, and a maximum ECN marking probability in the second ECN configuration information is equal to the maximum ECN marking probability in the first ECN configuration information.

Optionally, the processing unit 901 is further configured to determine the second ECN configuration information when an upper ECN threshold in the first ECN configuration information is equal to an upper ECN threshold in the third ECN configuration information, a lower ECN threshold in the first ECN configuration information is equal to a lower ECN threshold in the third ECN configuration information, a maximum ECN marking probability in the first ECN configuration information is greater than a maximum ECN marking probability in the third ECN configuration information, and the congestion degree increases, where an upper ECN threshold in the second ECN configuration information is equal to the upper ECN threshold in the first ECN configuration information, a lower ECN threshold in the second ECN configuration information is equal to the lower ECN threshold in the first ECN configuration information, and a maximum ECN marking probability in the second ECN configuration information is equal to the maximum ECN marking probability in the first ECN configuration information, or determine the second ECN configuration information when an upper ECN threshold in the first ECN configuration information is equal to an upper ECN threshold in the third ECN configuration information, a lower ECN threshold in the first ECN configuration information is equal to a lower ECN threshold in the third ECN configuration information, a maximum ECN marking probability in the first ECN configuration information is greater than a maximum ECN marking probability in the third ECN configuration information, and the congestion degree does not increase, where an upper ECN threshold in the second ECN configuration information is equal to the upper ECN threshold in the first ECN configuration information, a lower ECN threshold in the second ECN configuration information is equal to the lower ECN threshold in the first ECN configuration information, and a maximum ECN marking probability in the second ECN configuration information is greater than the maximum ECN marking probability in the first ECN configuration information.

Optionally, when the upper ECN threshold in the second ECN configuration information is equal to the upper ECN threshold in the first ECN configuration information, the lower ECN threshold in the second ECN configuration information is equal to the lower ECN threshold in the first ECN configuration information, and the maximum ECN marking probability in the second ECN configuration information is equal to the maximum ECN marking probability in the first ECN configuration information, the processing unit 901 is further configured to obtain second network status information, wherein the second network status information is used to indicate a network status when the second ECN configuration information is used, determine whether a quantity of ECN marked packets in the second network status information is less than a preset threshold, and if the quantity of ECN marked packets in the second network status information is greater than or equal to the preset threshold, determine fourth ECN configuration information based on the second ECN configuration information, wherein an upper ECN threshold in the fourth ECN configuration information is greater than the upper ECN threshold in the second ECN configuration information, a lower ECN threshold in the fourth ECN configuration information is equal to the lower ECN threshold in the second ECN configuration information, and a maximum ECN marking probability in the fourth ECN configuration information is equal to the maximum ECN marking probability in the second ECN configuration information, or if the quantity of ECN marked packets in the second network status information is less than the preset threshold, continue to perform ECN marking on the packet by using the second ECN configuration information.

If the electronic apparatus 900 is a network device, the transceiver unit 902 may be a transceiver unit of the network device, and the processing unit 901 may be a processing unit of the network device. The transceiver unit 902 may also be referred to as a transceiver, a transceiver apparatus, or the like. The processing unit 901 may also be referred to as a processor, a processing board, a processing module, a processing apparatus, or the like. Optionally, a component that is in the transceiver unit 902 and that is configured to implement a receiving function may be considered as a receiving unit, and a component that is in the transceiver unit 902 and that is configured to implement a sending function may be considered as a sending unit. That is, the transceiver unit 902 includes the receiving unit and the sending unit. The transceiver unit sometimes may also be referred to as a transceiver, a transceiver circuit, or the like. The receiving unit sometimes may also be referred to as a receiver, a receiver, a receiver circuit, or the like. The sending unit sometimes may also be referred to as a transmitter, a transmitter, a transmitter circuit, or the like.

If the electronic apparatus 900 is a chip, the transceiver unit 902 may be an input/output circuit or a communications interface, and the processing unit 901 may be a processor or an integrated circuit integrated on the chip.

It should be understood that FIG. 9 is merely an example instead of a limitation. The network device including the transceiver unit 901 and the processing unit 902 may not depend on the structure shown in FIG. 9.

For specific functions of the transceiver unit 902 and the processing unit 901, refer to the methods shown in FIG. 6A to FIG. 6C to FIG. 8.

Figure 10:
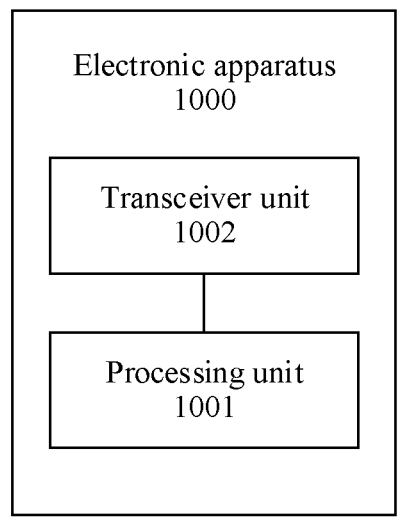
FIG. 10 is a schematic block diagram of a structure of another electronic apparatus according to an embodiment of this application.

FIG. 10 is a schematic block diagram of a structure of another electronic apparatus according to an embodiment of this application. As shown in FIG. 10, the electronic apparatus 1000 includes a processing unit 1001 and a transceiver unit 1002. The electronic apparatus 1000 may perform the steps performed by the second switch in the method shown in FIG. 7. The electronic apparatus 1000 may be a network device (for example, a switch), or may be a chip.

The transceiver unit 1002 is configured to separately receive N pieces of congestion indication information from N first switches.

The processing unit 1001 is configured to determine initial ECN configuration information based on the N pieces of congestion indication information.

The transceiver unit 1002 is further configured to send the initial ECN configuration information to the N first switches.

Optionally, the initial ECN configuration information includes N pieces of ECN configuration information, and the processing unit 1001 is further configured to determine the N pieces of ECN configuration information based on a congestion degree indicated by the N pieces of congestion indication information.

If the electronic apparatus 1000 is a network device, the transceiver unit 1002 may be a transceiver unit of the network device, and the processing unit 1001 may be a processing unit of the network device. The transceiver unit 1002 may also be referred to as a transceiver, a transceiver apparatus, or the like. The processing unit 1001 may also be referred to as a processor, a processing board, a processing module, a processing apparatus, or the like. Optionally, a component that is in the transceiver unit 1002 and that is configured to implement a receiving function may be considered as a receiving unit, and a component that is in the transceiver unit 1002 and that is configured to implement a sending function may be considered as a sending unit. That is, the transceiver unit 1002 includes the receiving unit and the sending unit. The transceiver unit sometimes may also be referred to as a transceiver, a transceiver circuit, or the like. The receiving unit sometimes may also be referred to as a receiver, a receiver, a receiver circuit, or the like. The sending unit sometimes may also be referred to as a transmitter, a transmitter, a transmitter circuit, or the like.

If the electronic apparatus 1000 is a chip, the transceiver unit 1002 may be an input/output circuit or a communications interface, and the processing unit 1001 may be a processor or an integrated circuit integrated on the chip.

It should be understood that FIG. 10 is merely an example instead of a limitation. The network device including the transceiver unit 1001 and the processing unit 1002 may not depend on the structure shown in FIG. 10.

For specific functions of the transceiver unit 1002 and the processing unit 1001, refer to the method shown in FIG. 7.

An embodiment of this application further provides a processing apparatus, including a processor and an interface. The processor may be configured to perform the method in the foregoing method embodiments.

It should be understood that the processing apparatus may be a chip. For example, the processing apparatus may be a field-programmable gate array (FPGA), an application-specific integrated circuit (ASIC), a system on chip (SoC), a central processing unit (CPU), a network processor (NP), a digital signal processor (DSP), a micro controller unit (MCU), a programmable logic device (PLD), another PLD, a discrete gate or a transistor logic device, a discrete hardware component, or another integrated chip.

In an implementation process, the steps in the foregoing methods can be implemented by using an integrated logic circuit of hardware in the processor, or by using instructions and/or program code in a form of software. The steps of the methods disclosed with reference to the embodiments of this application may be directly performed by a hardware processor, or may be performed by using a combination of hardware and software modules in the processor. The software module may be located in a mature storage medium in the art, such as a random-access memory (RAM), a flash memory, a read-only memory (ROM), a programmable ROM (PROM), an electrically erasable PROM (EEPROM), or a register. The storage medium is located in the memory, and the processor reads information in the memory and completes the steps of the foregoing methods in combination with hardware of the processor. To avoid repetition, details are not described herein again.

It should be noted that, the processor in the embodiments of this application may be an integrated circuit chip, and has a signal processing capability. In an implementation process, the steps in the foregoing method embodiments can be implemented by using an integrated logic circuit of hardware in the processor, or by using instructions and/or program code in a form of software. The general-purpose processor may be a microprocessor, or the processor may be any conventional processor or the like. The steps of the methods disclosed with reference to the embodiments of this application may be directly performed by a hardware decoding processor, or may be performed by using a combination of hardware and software modules in the decoding processor. The software module may be located in a mature storage medium in the art, such as a RAM, a flash memory, a ROM, a PROM, an EEPROM, or a register. The storage medium is located in the memory, and the processor reads information in the memory and completes the steps of the foregoing methods in combination with hardware of the processor.

It may be understood that the memory in this embodiment of this application may be a volatile memory or a nonvolatile memory, or may include a volatile memory and a nonvolatile memory. The nonvolatile memory may be a ROM, a PROM, an erasable PROM (EPROM), an EEPROM, or a flash memory. The volatile memory may be a RAM and is used as an external cache. For example, but not limitation, many forms of RAMs may be used, for example, a static RAM (SRAM), a dynamic RAM (DRAM), a synchronous DRAM (SDRAM), a double data rate (DDR) SDRAM, an enhanced SDRAM (ESDRAM), a synchlink DRAM (SLDRAM), and a direct rambus (DR) DRAM. It should be noted that, the memory in the system and method described in this specification includes but is not limited to these memories and any memory of another proper type.

According to the method provided in the embodiments of this application, this application further provides a computer program product. The computer program product includes computer program code. When the computer program code is run on a computer, the computer is enabled to perform the method in any one of the embodiments shown in FIG. 5 to FIG. 8.

According to the method provided in the embodiments of this application, this application further provides a computer-readable medium. The computer-readable medium stores program code. When the program code is run on a computer, the computer is enabled to perform the method in any one of the embodiments shown in FIG. 5 to FIG. 8.

According to the method provided in the embodiments of this application, this application further provides a system. The system includes the foregoing plurality of network devices.

A person of ordinary skill in the art may be aware that, units and algorithm steps in examples described with reference to the embodiments disclosed in this specification can be implemented by electronic hardware or a combination of computer software and electronic hardware. Whether the functions are performed by hardware or software depends on particular applications and design constraints of the technical solutions. A person skilled in the art may use different methods to implement the described functions for each particular application, but it should not be considered that the implementation goes beyond the scope of this application.

A person skilled in the art may clearly understand that, for the purpose of convenient and brief description, for detailed working processes of the foregoing systems, apparatuses, and units, refer to corresponding processes in the foregoing method embodiments. Details are not described herein again.

In the several embodiments provided in this application, it should be understood that the disclosed system, apparatus, and method may be implemented in other manners. For example, the described apparatus embodiments are merely examples. For example, division into units is merely logical function division and may be other division during actual implementation. For example, a plurality of units or components may be combined or integrated into another system, or some features may be ignored or not performed. In addition, the displayed or discussed mutual couplings or direct couplings or communication connections may be implemented through some interfaces. The indirect couplings or communication connections between the apparatuses or units may be implemented in electronic, mechanical, or other forms.

The units described as separate parts may or may not be physically separate, and parts displayed as units may or may not be physical units, may be located in one position, or may be distributed on a plurality of network units. Some or all of the units may be selected depending on actual requirements to achieve the objectives of the solutions in the embodiments.

In addition, functional units in the embodiments of this application may be integrated into one processing unit, each of the units may exist alone physically, or two or more units are integrated into one unit.

When the functions are implemented in a form of a software functional unit and sold or used as an independent product, the functions may be stored in a computer-readable storage medium. Based on such an understanding, the technical solutions of this application essentially, or a part contributing to an existing technology, or some of the technical solutions may be implemented in a form of a software product. The computer software product is stored in a storage medium, and includes several instructions and/or program code for instructing a computer device (which may be a personal computer, a server, or a network device) to perform all or some of the steps of the methods described in the embodiments of this application. The foregoing storage medium includes any medium that can store program code, such as a Universal Serial Bus (USB) flash drive, a removable hard disk, a ROM, a RAM, a magnetic disk, or an optical disc.

The foregoing descriptions are merely specific implementations of this application, but are not intended to limit the protection scope of this application. Any variation or replacement readily figured out by a person skilled in the art within the technical scope disclosed in this application shall fall within the protection scope of this application. Therefore, the protection scope of this application shall be subject to the protection scope of the claims.

What is claimed is:

1. A network congestion processing method, comprising:
    performing Explicit Congestion Notification (ECN) marking on a packet using first ECN configuration information;
    obtaining first network status information indicating a first network status;
    determining second ECN configuration information based on the first ECN configuration information and the first network status information;

performing the ECN marking on the packet using the second ECN configuration information; and sending the packet.

2. The network congestion processing method of claim 1, further comprising:

determining whether a first quantity of ECN marked packets in the first network status information is less than a first preset threshold;

when the first quantity of ECN marked packets is not less than the first preset threshold:

determining that a second upper ECN threshold in the second ECN configuration information is greater than a first upper ECN threshold in the first ECN configuration information;

determining that a second lower ECN threshold in the second ECN configuration information is equal to a first lower ECN threshold in the first ECN configuration information; and determining that a second maximum ECN marking probability in the second ECN configuration information is equal to a first maximum ECN marking probability in the first ECN configuration information; and determining that the second ECN configuration information is the same as the first ECN configuration information when the first quantity of ECN marked packets is less than the first preset threshold.

3. The network congestion processing method of claim 1, further comprising:

determining, based on the first network status information, a change trend of a congestion degree; and determining, based on the change trend, the first ECN configuration information, and third ECN configuration information, the second ECN configuration information, wherein the first ECN configuration information is based on the third ECN configuration information.

4. The network congestion processing method of claim 3, further comprising:

determining the second ECN configuration information when a first upper ECN threshold in the first ECN configuration information is greater than a third upper ECN threshold in the third ECN configuration information, a first lower ECN threshold in the first ECN configuration information is equal to a third lower ECN threshold in the third ECN configuration information, a first maximum ECN marking probability in the first ECN configuration information is equal to a third maximum ECN marking probability in the third ECN configuration information, and the congestion degree decreases, wherein a second upper ECN threshold in the second ECN configuration information is greater than the first upper ECN threshold, wherein a second lower ECN threshold in the second ECN configuration information is greater than the first lower ECN threshold, and wherein a second maximum ECN marking probability in the second ECN configuration information is equal to the first maximum ECN marking probability; and determining the second ECN configuration information when the first upper ECN threshold is greater than the third upper ECN threshold, the first lower ECN threshold is equal to the third lower ECN threshold, the first maximum ECN marking probability is equal to the third maximum ECN marking probability, and the congestion degree does not decrease, wherein the second upper ECN threshold is equal to the first upper ECN threshold, wherein the second lower ECN threshold is greater than the first lower ECN threshold, and wherein the second maximum ECN marking probability is equal to the first maximum ECN marking probability.

5. The network congestion processing method of claim 3, wherein before performing the ECN marking on the packet using the first ECN configuration information, the network congestion processing method further comprises:

obtaining reference network status information;

determining, based on the reference network status information, congestion indication information indicating the congestion degree;

sending, to a network device, the congestion indication information; and receiving, from the network device in response to the congestion indication information, the third ECN configuration information.

6. The network congestion processing method of claim 3, further comprising:

determining the second ECN configuration information when a first upper ECN threshold in the first ECN configuration information is greater than a third upper ECN threshold in the third ECN configuration information, a first lower ECN threshold in the first ECN configuration information is greater than a third lower ECN threshold in the third ECN configuration information, a first maximum ECN marking probability in the first ECN configuration information is equal to a third maximum ECN marking probability in the third ECN configuration information, and the congestion degree decreases, wherein a second upper ECN threshold in the second ECN configuration information is greater than the first upper ECN threshold, wherein a second lower ECN threshold in the second ECN configuration information is greater than the first lower ECN threshold, and wherein a second maximum ECN marking probability in the second ECN configuration information is equal to the first maximum ECN marking probability; and determining the second ECN configuration information when the first upper ECN threshold is greater than the third upper ECN threshold, the first lower ECN threshold is greater than the third lower ECN threshold, the first maximum ECN marking probability is equal to the third maximum ECN marking probability, and the congestion degree does not decrease, wherein the second upper ECN threshold is greater than the first upper ECN threshold, wherein the second lower ECN threshold is equal to the first lower ECN threshold, and wherein the second maximum ECN marking probability is equal to the first maximum ECN marking probability.

7. The network congestion processing method of claim 3, further comprising:

determining the second ECN configuration information when a first upper ECN threshold in the first ECN configuration information is equal to a third upper ECN threshold in the third ECN configuration information, a first lower ECN threshold in the first ECN configuration information is greater than a third lower ECN threshold in the third ECN configuration information, a first maximum ECN marking probability in the first ECN configuration information is equal to a third maximum ECN marking probability in the third ECN configuration information, and the congestion degree decreases, wherein a second upper ECN threshold in the second ECN configuration information is equal to the first upper ECN threshold, wherein a second lower ECN threshold in the second ECN configuration information is greater than the first lower ECN threshold, and wherein a second maximum ECN marking probability in the second ECN configuration information is less than the first maximum ECN marking probability; and determining the second ECN configuration information when the first upper ECN threshold is equal to the third upper ECN threshold, the first lower ECN threshold is greater than the third lower ECN threshold, the first maximum ECN marking probability is equal to the third maximum ECN marking probability, and the congestion degree does not decrease, wherein the second upper ECN threshold is equal to the first upper ECN threshold, wherein the second lower ECN threshold is equal to the first lower ECN threshold, and wherein the second maximum ECN marking probability is less than the first maximum ECN marking probability.

8. The network congestion processing method of claim 3, further comprising:

determining the second ECN configuration information when a first upper ECN threshold in the first ECN configuration information is equal to a third upper ECN threshold in the third ECN configuration information, a first lower ECN threshold in the first ECN configuration information is greater than a third lower ECN threshold in the third ECN configuration information, a first maximum ECN marking probability in the first ECN configuration information is less than a third maximum ECN marking probability in the third ECN configuration information, and the congestion degree decreases, wherein a second upper ECN threshold in the second ECN configuration information is equal to the first upper ECN threshold, wherein a second lower ECN threshold in the second ECN configuration information is greater than the first lower ECN threshold, and wherein a second maximum ECN marking probability in the second ECN configuration information is less than the second maximum ECN marking probability; and determining the second ECN configuration information when the first upper ECN threshold is equal to the third upper ECN threshold, the first lower ECN threshold is greater than the third lower ECN threshold, the first maximum ECN marking probability is less than the third maximum ECN marking probability, and the congestion degree does not decrease, wherein the second upper ECN threshold is equal to the first upper ECN threshold, wherein the second lower ECN threshold is greater than the first lower ECN threshold, and wherein the second maximum ECN marking probability is equal to the first maximum ECN marking probability.

9. The network congestion processing method of claim 3, further comprising:

determining the second ECN configuration information when a first upper ECN threshold in the first ECN configuration information is equal to a third upper ECN threshold in the third ECN configuration information, a first lower ECN threshold in the first ECN configuration information is equal to a third lower ECN threshold in the third ECN configuration information, a first maximum ECN marking probability in the first ECN configuration information is less than a third maximum ECN marking probability in the third ECN configuration information, and the congestion degree decreases, wherein a second upper ECN threshold in the second ECN configuration information is equal to the first upper ECN threshold, wherein a second lower ECN threshold in the second ECN configuration information is equal to the first lower ECN threshold, and wherein a second maximum ECN marking probability in the second ECN configuration information is less than the first maximum ECN marking probability; and determining the second ECN configuration information when the first upper ECN threshold is equal to the third upper ECN threshold, the first lower ECN threshold is equal to the third lower ECN threshold, the first maximum ECN marking probability is less than the third maximum ECN marking probability, and the congestion degree does not decrease, wherein the second upper ECN threshold is less than the first upper ECN threshold, wherein the second lower ECN threshold is equal to the first lower ECN threshold, and wherein the second maximum ECN marking probability is equal to the first maximum ECN marking probability.

10. The network congestion processing method of claim 3, further comprising:

determining the second ECN configuration information when a first upper ECN threshold in the first ECN configuration information is less than a third upper ECN threshold in the third ECN configuration information, a first lower ECN threshold in the first ECN configuration information is equal to a third lower ECN threshold in the third ECN configuration information, a first maximum ECN marking probability in the first ECN configuration information is equal to a third maximum ECN marking probability in the third ECN configuration information, and the congestion degree increases, wherein a second upper ECN threshold in the second ECN configuration information is equal to the first upper ECN threshold, wherein a second lower ECN threshold in the second ECN configuration information is less than the first lower ECN threshold, and wherein a second maximum ECN marking probability in the second ECN configuration information is equal to the first maximum ECN marking probability; and determining the second ECN configuration information when the first upper ECN threshold is less than the third upper ECN threshold, the first lower ECN threshold is equal to the third lower ECN threshold, the first maximum ECN marking probability is equal to the third maximum ECN marking probability, and the congestion degree does not increase, wherein the second upper ECN threshold is less than the first upper ECN threshold, wherein the second lower ECN threshold is equal to the first lower ECN threshold, and wherein the second maximum ECN marking probability is equal to the first maximum ECN marking probability.

11. The network congestion processing method of claim 3, further comprising:

determining the second ECN configuration information when a first upper ECN threshold in the first ECN configuration information is equal to a third upper ECN threshold in the third ECN configuration information, a first lower ECN threshold in the first ECN configuration information is less than a third lower ECN threshold in the third ECN configuration information, a first maximum ECN marking probability in the first ECN configuration information is equal to a third maximum ECN marking probability in the third ECN configuration information, and the congestion degree increases, wherein a second upper ECN threshold in the second ECN configuration information is equal to the first upper ECN threshold, wherein a second lower ECN threshold in the second ECN configuration information is equal to the first lower ECN threshold, and wherein a second maximum ECN marking probability in the second ECN configuration information is greater than the first maximum ECN marking probability; and determining the second ECN configuration information when the first upper ECN threshold is equal to the third upper ECN threshold, the first lower ECN threshold is less than the third lower ECN threshold, the first maximum ECN marking probability is equal to the third maximum ECN marking probability, and the congestion degree does not increase, wherein the second upper ECN threshold is equal to the first upper ECN threshold, wherein the second lower ECN threshold is less than the first lower ECN threshold, and wherein the second maximum ECN marking probability is equal to the first maximum ECN marking probability.

12. The network congestion processing method of claim 3, further comprising:

determining the second ECN configuration information when a first upper ECN threshold in the first ECN configuration information is equal to a third upper ECN threshold in the third ECN configuration information, a first lower ECN threshold in the first ECN configuration information is equal to a third lower ECN threshold in the third ECN configuration information, a first maximum ECN marking probability in the first ECN configuration information is greater than a third maximum ECN marking probability in the third ECN configuration information, and the congestion degree increases, wherein a second upper ECN threshold in the second ECN configuration information is equal to the first upper ECN threshold, wherein a second lower ECN threshold in the second ECN configuration information is equal to the first lower ECN threshold, and wherein a second maximum ECN marking probability in the second ECN configuration information is equal to the first maximum ECN marking probability; and determining the second ECN configuration information when the first upper ECN threshold is equal to the third upper ECN threshold, the first lower ECN threshold is equal to the third lower ECN threshold, the first maximum ECN marking probability is greater than the third maximum ECN marking probability, and the congestion degree does not increase, wherein the second upper ECN threshold is equal to the first upper ECN threshold, wherein the second lower ECN threshold is equal to the first lower ECN threshold, and wherein the second maximum ECN marking probability is greater than the first maximum ECN marking probability.

13. The network congestion processing method of claim 12, wherein when the second upper ECN threshold is equal to the first upper ECN threshold, the second lower ECN threshold is equal to the first lower ECN threshold, and the second maximum ECN marking probability is equal to the first maximum ECN marking probability, the network congestion processing method further comprises:

obtaining second network status information indicating a second network status when the second ECN configuration information is used;

determining whether a second quantity of ECN marked packets in the second network status information is less than a second preset threshold;

determining, based on the second ECN configuration information, fourth ECN configuration information when the second quantity of ECN marked packets is not less than the second preset threshold, wherein a fourth upper ECN threshold in the fourth ECN configuration information is greater than the second upper ECN threshold, wherein a fourth lower ECN threshold in the fourth ECN configuration information is equal to the second lower ECN threshold, and wherein a fourth maximum ECN marking probability in the fourth ECN configuration information is equal to the second maximum ECN marking probability; and continuing to perform the ECN marking on the packet using the second ECN configuration information when the second quantity of ECN marked packets is less than the second preset threshold.

14. A communications device comprising:

a processor; and a memory coupled to the processor and configured to store instructions that when executed by the processor, cause the communications device to:

perform Explicit Congestion Notification (ECN) marking on a packet using first ECN configuration information;

obtain first network status information indicating a network status;

determine, based on the first ECN configuration information and the first network status information, second ECN configuration information;

perform the ECN marking on the packet using the second ECN configuration information; and send the packet.

15. The communications device of claim 14, wherein, when executed by the processor, the instructions further cause the communications device to:

determine whether a quantity of ECN marked packets in the first network status information is less than a preset threshold;

when the quantity of ECN marked packets is not less than the preset threshold:

determine that a second upper ECN threshold in the second ECN configuration information is greater than a first upper ECN threshold in the first ECN configuration information;

determine that a second lower ECN threshold in the second ECN configuration information is equal to a first lower ECN threshold in the first ECN configuration information; and determine that a second maximum ECN marking probability in the second ECN configuration information is equal to a first maximum ECN marking probability in the first ECN configuration information; and determine that the second ECN configuration information is the same as the first ECN configuration information when the quantity of ECN marked packets is less than the preset threshold.

16. The communications device of claim 14, wherein, when executed by the processor, the instructions further cause the communications device to:

determine, based on the first network status information, a change trend of a congestion degree; and determine, based on the change trend, the first ECN configuration information, and third ECN configuration information, the second ECN configuration information, wherein the first ECN configuration information is based on the third ECN configuration information.

17. A chip system comprising:
an input/output interface; and
a logic circuit coupled to the input/output interface and configured to:
- perform Explicit Congestion Notification (ECN) marking on a packet using first ECN configuration information;
- obtain first network status information indicating a network status when the first ECN configuration information is used;
- determine, based on the first ECN configuration information and the first network status information, second ECN configuration information;
- perform the ECN marking on the packet using the second ECN configuration information; and
- send the packet.

18. The chip system of claim 17, wherein the logic circuit is further configured to:
- determine whether a quantity of ECN marked packets in the first network status information is less than a preset threshold; and
- when the quantity of ECN marked packets is not less than the preset threshold:
  - determine that a second upper ECN threshold in the second ECN configuration information is greater than a first upper ECN threshold in the first ECN configuration information;
  - determine that a second lower ECN threshold in the second ECN configuration information is equal to a first lower ECN threshold in the first ECN configuration information; and
  - determine that a second maximum ECN marking probability in the second ECN configuration information is equal to a first maximum ECN marking probability in the first ECN configuration information.

19. The chip system of claim 17, wherein the logic circuit is further configured to:
- determine whether a quantity of ECN marked packets in the first network status information is less than a preset threshold; and
- determine that the second ECN configuration information is the same as the first ECN configuration information when the quantity of ECN marked packets is less than the preset threshold.

20. The chip system of claim 17, wherein the logic circuit is further configured to:
- determine, based on the first network status information, a change trend of a congestion degree; and
- determine, based on the change trend, the first ECN configuration information, and third ECN configuration information, the second ECN configuration information, wherein the first ECN configuration information is based on the third ECN configuration information.

* * * * *